(12) United States Patent
Wires et al.

(10) Patent No.: US 11,237,871 B1
(45) Date of Patent: *Feb. 1, 2022

(54) METHODS, SYSTEMS, AND DEVICES FOR ADAPTIVE DATA RESOURCE ASSIGNMENT AND PLACEMENT IN DISTRIBUTED DATA STORAGE SYSTEMS

(71) Applicant: OPEN INVENTION NETWORK LLC, Durham, NC (US)

(72) Inventors: Jacob Taylor Wires, Vancouver (CA); Andrew Warfield, Vancouver (CA)

(73) Assignee: OPEN INVENTION NETWORK LLC, Durham, NC (US)

( * ) Notice: Subject to any disclaimer, the term of this patent is extended or adjusted under 35 U.S.C. 154(b) by 11 days.

This patent is subject to a terminal disclaimer.

(21) Appl. No.: 16/883,880

(22) Filed: May 26, 2020

Related U.S. Application Data

(63) Continuation of application No. 16/261,534, filed on Jan. 29, 2019, now Pat. No. 10,664,315, which is a continuation of application No. 15/430,668, filed on Feb. 13, 2017, now Pat. No. 10,191,773.

(60) Provisional application No. 62/294,359, filed on Feb. 12, 2016.

(51) Int. Cl.
| | |
|---|---|
| *G06F 9/50* | (2006.01) |
| *G06F 16/11* | (2019.01) |
| *G06F 16/182* | (2019.01) |
| *G06F 16/27* | (2019.01) |

(52) U.S. Cl.
CPC .......... *G06F 9/5016* (2013.01); *G06F 9/5083* (2013.01); *G06F 16/11* (2019.01); *G06F 16/182* (2019.01); *G06F 16/27* (2019.01)

(58) Field of Classification Search
CPC ....... G06F 16/27; G06F 16/182; G06F 9/5083
See application file for complete search history.

(56) References Cited

U.S. PATENT DOCUMENTS

| | | | |
|---|---|---|---|
| 2012/0203999 A1* | 8/2012 | Jess | G06F 3/0665 711/173 |
| 2013/0290598 A1 | 10/2013 | Fiske et al. | |

(Continued)

*Primary Examiner* — Dong U Kim

(57) ABSTRACT

A distributed computing system for automatic constraint-based data resource arrangement, comprising a plurality of computing components being communicatively coupled to each other, each computing component comprising the following data resources: data storage media for storing client-related digital information, a data processor for processing said client-related digital information, and a network communications interface for communicating said client-related digital information; and a constraint engine for automatically determining alternate arrangements of said data resource assignments, said constraint engine comprising a constraint processor and a constraint database, said constraint database for receiving and storing changeable digital constraint parameters indicative of permissible operational constraints on said data resources, wherein said alternate arrangements comply with at least a first set of said changeable digital constraint parameters; wherein said data resource assignments are reassigned from a current arrangement in accordance with a selected one of said alternate arrangements upon an operational change to said data storage system.

20 Claims, 4 Drawing Sheets

(56) References Cited

U.S. PATENT DOCUMENTS

| | | | |
|---|---|---|---|
| 2013/0297869 A1* | 11/2013 | Mills | G06F 3/061 |
| | | | 711/112 |
| 2013/0297872 A1* | 11/2013 | Hyde, II | G06F 3/061 |
| | | | 711/117 |
| 2016/0188668 A1 | 6/2016 | Sharangpani | |
| 2016/0378616 A1* | 12/2016 | Wigmore | G06F 11/1435 |
| | | | 711/162 |
| 2017/0351553 A1 | 12/2017 | Terayama et al. | |

* cited by examiner

METHODS, SYSTEMS, AND DEVICES FOR ADAPTIVE DATA RESOURCE ASSIGNMENT AND PLACEMENT IN DISTRIBUTED DATA STORAGE SYSTEMS

FIELD OF THE DISCLOSURE

The present disclosure relates to data storage systems, and, in particular, to methods, systems, and devices for adaptive data resource assignment and placement in distributed data storage systems.

BACKGROUND

In many data storage systems, the use of an array of distributed storage has been well explored to improve performance and reliability of data storage. Through using an array of distributed storage, performance may be improved by, for example, (a) permitting data reads or writes for portions of a requested data object, file or chunk concurrently from multiple disks or (b) permitting reads to be returned from the disk with the lowest latency, if there are redundant versions of data (note that this may have an adverse effect on writes since a complete write operation is only as fast as the slowest disk to which it is written). Reliability may be increased if mirroring or parity is used to provide redundant copies of data (or the data that permits the recreation of lost data).

For example, RAID is a common technology used with arrays of data storage components to increase the performance and/or reliability of data storage on those components. RAID is abbreviation that stands for "Redundant Array of Inexpensive Disks." A data storage system that implements RAID may consist of two or more storage components working together to serve up data. These components have historically been hard disks, but other types of data storage components may be used, including technology for SSD (solid state drives). Depending on requirements and circumstances, various RAID levels may be implemented, each optimized for a specific situation. While these naming conventions have not been standardized by an industry group or standards body, they do appear to have developed as a more or less reliable naming convention over time, although some entities may use their own naming conventions to describe similar technologies. Some of the RAID levels include RAID 0 (striping), RAID 1 (mirroring), RAID 5 (striping with parity), RAID 6 (striping with double parity), and RAID 10 (combination of mirroring and striping).

The software to perform the RAID-functionality and control the drives can either be located on a separate controller card (a hardware RAID controller) or it can simply be a driver. Some versions of Windows, such as Windows Server 2012 as well as Mac OS X, include software RAID functionality. Hardware RAID controllers cost more than pure software but they also offer better performance. RAID-systems can be based with a number of interfaces, including SCSI, IDE, SATA or FC (fibre channel.) There are systems that use SATA disks internally but have a FireWire or SCSI-interface for the host system. Sometimes disks in a storage system are defined as JBOD, which stands for 'Just a Bunch Of Disks'. This means that those disks do not use a specific RAID level and act as stand-alone disks. This is often done for drives that contain swap files or spooling data.

Since most modern distributed disk systems have been based on systems that resemble or have evolved from RAID methodologies, such systems arrange data depending on pre-determined data placement decision-making schemes that attempt to balance various key objectives. These include performance and reliability, but may also include availability and capacity. For example, RAID technologies assign data storage resources that distribute portions (e.g. a stripe or a chunk) of a discrete set of data, such as a file or object, across an array of independent disks. An associated file system maintains an index of the data locations, or otherwise manages the locations of the stored data. A decision-making scheme decides where to place each portion on each disk based on a set of static constraints, such static constraints being fixed at the time when the data is assigned to specific locations. When one of the devices fails on which a primary replicate is being used, the system finds the back-up copy and either uses that copy or writes a new copy (either copied from another copy that is a mirror or rebuilds the copy using parity) to the previously failed replica location. Load balancing may also be implemented by distributing some portion of replicates to the least loaded device in the array (which may support more than one of the key objectives discussed above). Each of these performance requirements may be considered a constraint that must be maintained by the system. For example, RAID 5 requires single parity for all data. RAID 0 requires at least 1 replica (or mirror) for all data. In other cases, ensuring that not all replicas exist in the same failure domain (e.g. different disks on the same server rack may be considered the same failure domain).

Many modern data storage systems have implemented improvements to be scalable and adaptive. Scalable means that storage resources, including specific tiers of data storage resources that may be required depending on the nature of at least some of the data stored in the system as well as the uses of that associated data, can be added to the data storage system over time as the requirements for the data begin to approach or exceed the available resources.

Moreover, recent developments in data storage have recognized that different data should be treated differently at different times; in other words adaptive. For example, some specific sets of data may be associated by an increased demand (or likelihood for demand) for access or writing/updating, or an increased likelihood of such demand, at identifiable or predictable times. Some data, or the processing thereof, may be associated with a significant value for very low latency, availability, reliability, or other performance-based metric (and such association may vary over time or in connection with some other characteristic, including but not limited to the identity or location of the data client). These examples may be considered high priority or "hot" data. Conversely, infrequently accessed data, or data that does not require specific performance guarantees, may be considered "cold" or low priority data. For example, high priority data may include information relating to trades on a public stock exchange requiring near instantaneous updating. Additionally, banking and shopping information may require near perfect locking from concurrent requests; in contrast, low priority data may include data used to install an operating system and which may be requested or changed only very infrequently, and even when it is changed, does not require low-latency. Modern storage systems have devised improvements for pushing high priority data with appropriately performing data storage resources (i.e. higher tiers). High tier performance for high priority data may be considered a constraint.

For all of the above reasons, as well as others, there is a requirement to be able to dynamically assign specific data resources, or classes of data resources, for specific reasons and specific uses, in order to meet a set of constraints associated with the storage of that data. Known systems have implemented techniques for distributing data within a data storage system based on an initial set of static data storage constraints, but techniques for optimizing compliance, particularly as data characteristics change and the data storage system changes, and as the data storage constraints themselves are changed (including adding new ones or removing old ones), have not been well addressed.

During the assignment of resources, particularly as circumstances relating to a given data storage system change over time, rapidly or otherwise, the complexity of ensuring compliance with performance-related constraints grows exponentially or super-exponentially as the degrees of freedom relating to the assignment of resources of data storage system grows. Among other reasons, this may be in large part to the sheer number of combinations of different assignments of many different resources. Moreover, reassigning resources from a current state to a combination that complies with some or all of the constraints, or does so more optimally than a current (or indeed any other) combination, may require significant effort on the part of the data storage system. This effort may overcome any benefit associated with the new combination and, accordingly, systems are required that determine new optimal arrangements wherein the costs of re-arrangement do not overcome the potential benefit of the more optimal arrangement.

As data centres increase in size, and complexity, an important observation that relates to data and data resources is that static resource allocation has become insufficient: (i) characteristics for a given set of data, including priority, change over time, (ii) data resources are, sometimes as a result of a change in data characteristics and sometimes as a result of other causes including failure, are also in rapid flux, and (iii) the constraints that guide resource allocation can change. As such, data placement that is limited to initial and/or static storage-related resource constraints is insufficient. Moreover, given the degree of complexity over data resource allocation for data sets, a manner of transitioning a given resource allocation into another resource allocation that does not overcome the benefit of an alternative data placement allocation is required.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

A need exists for methods, systems, and devices for adaptive data resource assignment and placement in distributed data storage systems that overcome some of the drawbacks of known techniques, or at least, provides a useful alternative thereto. Some aspects of this disclosure provide examples of such methods, systems and devices.

In accordance with some aspects, methods, systems, and devices are provided for adaptive data resource assignment and placement in distributed data storage systems.

In one embodiment, there is provided a distributed data storage system for automatic constraint-based data resource arrangement, said data storage system comprising: a plurality of data storage components being communicatively coupled to each other, each data storage component comprising the following data resources: data storage media for storing client-related digital information, a data processor for processing said client-related digital information, and a network communications interface for communicating said client-related digital information; and a constraint engine for automatically determining alternate arrangements of said data resource assignments, said constraint engine comprising a constraint processor and a constraint database, said constraint database for receiving and storing changeable digital constraint parameters indicative of permissible operational constraints on said data resources, wherein said alternate arrangements comply with at least a first set of said changeable digital constraint parameters; wherein said data resource assignments are reassigned from a current arrangement in accordance with a selected one of said alternate arrangements upon an operational change to said data storage system.

In one embodiment, there is provided a distributed data storage system for automatic constraint-based data resource arrangement, the data storage system comprising: a plurality of data storage components communicatively coupled to each other, each of said data storage components comprising at least one data resource selected from a data storage media for storing client-related digital information, a data processor for processing said client-related digital information, and a network communications interface for communicating said client-related digital information; and a constraint engine comprising a constraint processor and a constraint database, said constraint database receiving and storing changeable digital constraint parameters indicative of permissible operational constraints on said data storage system, and said constraint processor automatically determining permissible data resource assignment arrangements in accordance with said changeable digital constraint parameters so to assign at least some said data resource for use with said client-related digital information in compliance with said permissible operational constraints on said data storage system; wherein, in response to an operational change to said data storage system, at least some said data resource are automatically reassigned from a current permissible data resource assignment arrangement to an alternate permissible data resource assignment arrangement automatically determined by said constraint engine to comply with a designated set of said changeable digital constraint parameters.

In one embodiment, there is provided a distributed data storage system configured to dynamically implement constraint-based assignment of data resources therein, said data storage system comprising: a plurality of interoperable data storage components, each data storage component comprising a data storage medium, access to a data processor, and access to a network communications interface; and a constraint engine for determining arrangements of data resource assignments and corresponding constraint matching parameters associated with each arrangement, said constraint matching parameters indicative of the degree to which the corresponding arrangement would meet a set of changeable data storage system constraints; wherein said data resources are automatically assigned in accordance with one of said arrangements having associated constraint matching parameters that are at least equal to constraint thresholds corresponding to said constraint matching parameters.

In systems, methods and devices disclosed herein, distributed data storage systems are adaptive to the needs and characteristics of the data and the data clients (that is, the entity interacting with the data storage system for accessing or writing/updating data therein). In general, this means that systems can promote and demote data to and from particular storage tiers to match storage performance with dynamically changing data requirements. In addition to data placement on the most appropriately performing data storage component (e.g. location and tier-type of storage), the data connectivity and data computing resources that are associated with the relevant data storage components where the data is stored must also be scalable and adaptive since these will have a significant impact on performance characteristics as experienced by the data client. Particularly as data storage performance approaches and/or exceeds networking and communication speeds, processing speed increases, and storage-side processing becomes more common, the system must account for these additional resources when seeking to optimize data system performance. For example, the system may transfer high priority data to higher storage tiers (or vice versa), it may also transfer such higher priority data to an equivalent storage tier that can provide faster communication since it lies on a network node that is "closer" or is less busy (or transfer lower priority data to the node with the slower or less direct connection). In disclosed data storage systems, there may be instances where there is at least some data processing of live data associated with the data storage system within the data storage system—or storage-side data processing—prior to or after data is stored on or accessed from the system. Again, for high priority data, the data storage system will operate more optimally if the faster processors, or those with the most capacity, are used for such storage-side processing. The system, as for the storage tier and connectivity resource matching, can either transfer the data, or a replica thereof to the most appropriate location in the data storage system, or it may choose the replica that already exists on a node with fast and/or available processing power. As the system adapts or changes by, for example, transferring or using the most appropriate resources available, adding or scaling storage resources, reacting to system failures or performance degradation, changes in data characteristics including priority, as well as many other extrinsic or intrinsic changes, the constraints under which the system must operate may no longer be in compliance (or the degree to which the system is in compliance with such constraints may be impacted). As such, data resources must be arranged differently to ensure compliance (or a higher or minimum degree of compliance). Even as characteristics of the data and the data storage system itself changes, the constraints themselves may be changed by a data client, administrator, or automatically by the system itself. As such, the assignment and placement of data resources must adapt thereto to ensure that data storage objectives and constraints are at least maintained, if not optimized. Assignment and placement on a static basis is no longer sufficient and adaptive data resource arrangement and placement must be implemented in the face of adaptive and scalable storage.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

DETAILED DESCRIPTION

Figure 1:
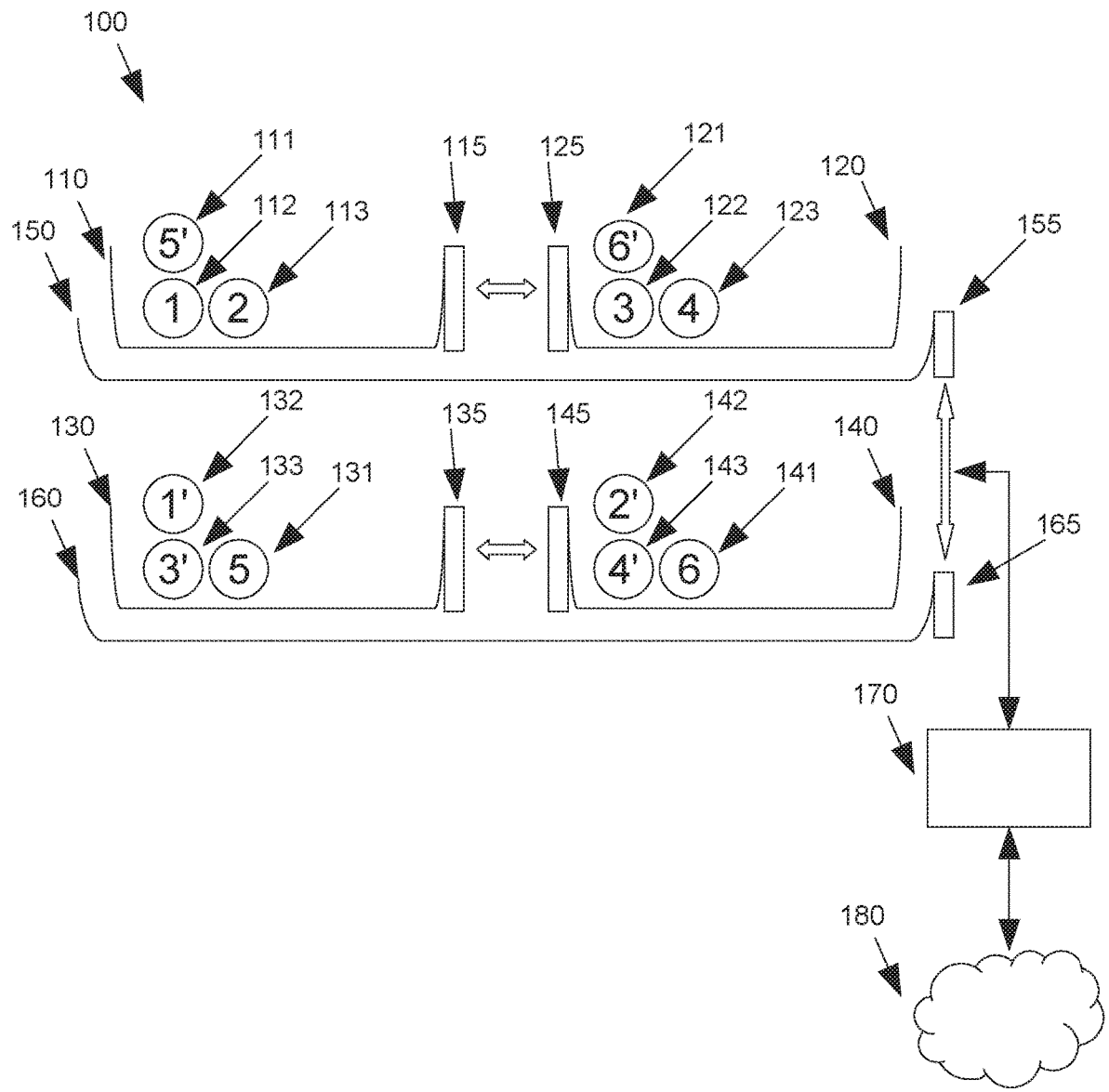
FIG. 1 is an illustration of a data storage system comprising data storage components in one possible operating environment in accordance one aspect of the instantly disclosed subject matter.

The systems and methods described herein provide, in accordance with different embodiments, different examples in which There are provided systems, and associated methods and devices, for automatic and/or adaptive assignment and placement of data storage and other resources for a distributed data storage or computing system, wherein the assignment and placement of data, connections thereto, and processing thereof, is constraint-based and is automatically and continually implemented to adapt to any changes that occur in the data storage systems, including to the data itself stored therein, and the constraints declared therefor. Unlike other systems, wherein data storage resources (the control of which tend to be limited to data storage and not connectivity and/or compute resources) are assigned as data is written to the system based on then-current constraints and conditions and the assignment is not updated as the data, the data storage resources or the associated constraints change, the instant subject matter supports re-assignment and re-distribution of resources, and ways to identify and assess possible alternatives for re-assignment and re-distribution, upon any such changes experienced or anticipated to be experienced by the system.

Embodiments hereof assign and/or place data resources in accordance with constraints, both hard and soft, which are imposed on the data storage system by any or all of: the system, a system administrator, a data client, the system owner, and/or another entity. A hard constraint provides for specific conditions which must be met (or not met) without exception, such as "all replicas for all objects must be placed in different failure domains"; a soft constraint may provide for a generalized objective or preference having a range of acceptable states and sometimes with a stronger preference within such range for specific states, such as the capacity of all disks should be balanced and no disk should be more than 15% from the average storage media device capacity in a given tier of storage in the system. Alternatively, a soft constraint may be binary, in that it may permit only either a compliant state (or set or range of states) and non-compliant state (or set or range of states), which may be permitted to operate in a non-compliant state, and thus permit suboptimal or less optimal with respect to that constraint. In such a case, a system operating with a high degree of non-compliant soft constraints may be less desirable and be associated with reduced overall performance than the same or another system with a lower degree of non-compliant soft constraints. The objective of some embodiments may, for example, be to determine an updated assignment of data and/or data resources that ensures compliance with all hard constraints, minimizes non-compliance of soft constraints, and determines one or more processes for transitioning from a current resource placement to the updated placement with reduced impact on the performance of the data storage system. As changes occur to the data storage system, such as but not limited to hardware failure, a change in data priority over time (i.e. "cold" data becomes "hot" for a given time interval), addition of data storage resources, addition of more data or data clients/users, or a change in constraints (e.g. a constraint is added or removed, or a hard constraint becomes soft or vice versa), this process may be repeated, and it may in some embodiments be repeated continually or upon the occurrence of an event. Constraints may apply both to the considered resource assignment, but also the implementation of the resource re-assignment (e.g. only a certain amount of data may be moved in satisfying all other constraints).

As changes occur that impact the data storage system including changes to the data itself, the addition, removal or amendment of constraints, or changes to the data storage system, both intended and unintended, the assignment and placement of data resources (i.e. arrangement) may begin to violate or be sub-optimal with respect to any one or more of the constraints. As such the system, may determine another re-assignment and placement of data resources that will avoid or reduce non-compliance with the constraints; data storage allocations may have to be re-allocated, communications connections (including TCP or other communications channels) may have to be re-assigned to different storage nodes or ports thereof (possibly without having re-initiate an entire data request process), and different processing resources may have to be re-assigned to, for example, perform or complete storage-side data analysis or processing. Any of the following include, inter alia, possible changes to the system: adding storage components (e.g. adding a new disk or other storage media device); removing storage components (e.g. failure of a component, a component becoming unresponsive to due to a servicing of another data storage process, such as responding to a demanding and/or higher priority data client, or a component becoming taking too long to respond to data requests of a particular priority); promotion or demotion of data from one storage tier to another storage tier; adding, removing or changing constraints on resource allocation; the addition, subtraction, or changes to data clients (or types thereof); specific client requests that overload storage capacity and performance, connectivity, and processing power on one or more data storage components, possibly relative to the priority of the data and/or data requests associated therewith; and any other events having an operational impact on data storage system performance.

Since there may be a cost (e.g. a reduction in one or more performance attributes) to transitioning to a different arrangement of resources from a current arrangement, which will result in compliance with hard constraints and/or increased compliance with the set of all soft constraints, the system will attempt to minimize the number of changes needed to reach a new state, as well as the individual and cumulative impact of such changes on system operation. In some embodiments, the minimal number of changes required to achieve a different optimal state will be assessed and, providing that the different optimal state has the necessary degree of compliance with system constraints and the cost of the re-assignment to the new placement does not overcome the benefit of the increased compliance with the constraints, the system will then implement those changes. Such implementation may include, for example, the movement or duplication of a set or sets of data from a first storage node or set thereof to a second node or set thereof, the transition of communication from a first node to another node (without "breaking" a connection and/or having to re-start a communication or data request), or using a different node that has a reduced processing load to perform processing on a set of data stored in the system.

For example, as data stored in the data storage system is promoted to higher tier storage, and other data is demoted to lower tier storage, such movement of data may render one or more constraints to a sub-optimal state or cause one or more constraints to be violated. A new arrangement of resources may have to be determined, and then be transitioned to. Alternatively, the same data sets may be characterized as "cold" during certain time intervals and "hot" during other time intervals, which could also render constraints violated or sub-optimal during or outside of such time intervals. A new arrangement of data resources may have to be determined and then implemented in order to alleviate such violated or sub-optimal constraints—but only for certain time intervals. Since the number of possible alternative arrangements, and constraints associated therewith—whether compliant or otherwise, is very large, there could be a wide range of both the number of moves (i.e. steps to transition from a first placement of resources to a second placement of data. In addition, the encumbrance on system performance caused by the any of the moves and/or the number of required moves, will impact performance. Since the resulting performance cost of making a transition to a new arrangement may not always be worth the resulting performance benefit (or improved constraint compliance), such performance cost is considered when selecting a new arrangement. The permitted performance cost for a transition may be implemented in some embodiments as a constraint (hard or soft), or it may be implemented as a separate requirement. The permitted cost may be measured in the number of moves, the individual or cumulative cost of specific moves (e.g. moving a large chunk of data from one failure domain to another that is many network "hops" away, will have a different impact than moving a small chunk of data from one medium to another on the same device), or a combination thereof. In addition, weightings of the impact of certain moves or types of moves may be utilized in identifying the best alternative arrangements or re-allocation schemes.

In some cases, changes in characteristics of the data associated with the data storage system may cause the system to (a) have reduced compliance or (b) force the system, in order to maintain sufficient compliance, to treat the data in accordance with new or existing constraints. For example, as data clients store or interact with data with a given priority or locality, there may be a requirement that a specific set of data be associated with certain data storage components and/or storage locations therein in order to maintain or achieve the requisite degree of compliance with constraints.

In other cases, the constraints themselves may be added, removed or amended, including by making a soft constraint hard or vice versa. Constraints are not static; a data client (or another user of the data storage system), the data storage system, or an administrator of the data storage system, may cause a change relating to the constraints.

In other cases, other changes to the data storage system may cause the data storage system to have reduced compliance with applicable constraints, including undesired and/or unintended changes. For example, a failure of a data storage component may result in constraint violation, such as a constraint on the number of replicas of a chunk of data (if, for example, a replica was being stored on the failed component and the loss of that component causes the system to fall below a minimum replication level). Whereas typical RAID methodologies will simply attempt to rebuild the lost data set on the same or different data storage resources, the subject matter of the instant disclosure will re-distribute the data resources, including storage, connect, and compute resources, across the remaining system to achieve the same level of constraint compliance across the now-changed distributed data storage system. In another example, by adding additional data storage components, including sets of data storage components (e.g. a NADS-unit comprising multiple spinning disks and multiple SSD resources), additional possibilities for more optimal data resources assignment become possible, and embodiments of the instant invention will automatically adapt to such changes to determine whether such arrangements exist, and if so, implement them. In such cases, the system may implement such changes even if a current arrangement is in compliance (or an acceptable level of compliance) in order to achieve a state of increased compliance and/or operational benefit.

Additional constraints may be added, removed, or changed in a number of ways. For example, a user may add additional constraints at any time, or a constraint may otherwise become present or applicable during operation of the data storage system (in some embodiments, constraints may be configured to impose on the data storage system certain objectives or restrictions at certain times or if certain conditions are true); conversely, if a constraint is removed, the system may become sub-optimal with respect to other constraints and system improvement could be achievable upon a re-assignment and re-placement of the data resources.

The foregoing examples are included herein as non-limiting illustrations of changes to the data storage system in respect of which adaptive and dynamic assignment and placement of data resources are determined and then implemented. In embodiments, the data resources include (1) data storage resources (e.g. disks, SSDs, or other storage media type); (2) client connectivity resources with data storage resources (e.g. a NIC port, or a distributable TCP connection or other networking data path between data client and the data host(s) having the applicable data storage location and ability to respond to data requests) or the physical and virtual connections and ports associated with one or more data nodes; and (3) data processing resources, such as storage-side data processors in the data storage components.

Referring to FIG. 1, there is shown a conceptual representation of data storage resources across a distributed data storage system 100. There are shown, for illustrative purposes, various conceptual representations of storage components 110, 120, 130 and 140, which may represent spinning disk drives, solid state drives (SSD), or any other type of data storage component or array thereof. There is also shown a conceptual representation of a larger failure domain 150 160 such as a node, a server, a server or a tray on a rack, a rack, in which each storage component resides. Each failure domain 150, 160 is in general any portion of the data storage system containing one or more storage components that could fail to operate (or operate with reduced performance) due to or in connection with their association with such domain resulting in a loss or reduced performance of all the storage components (or other data resources) associated with such domain; for example, it may include the following non-limiting examples: a node, a tray, a server, a device, a server rack, a server blade, a location, a server farm, a building, or even a city or other geographic location, that becomes inoperative for a given purpose or function(s). A failure domain is characterized in that all storage components (or other resources of the storage system) within that failure domain can be subject to the same cause or causes of failure, although storage components or other resources need not necessarily fail due to such cause. For example, multiple storage components on the same server rack may fail if the server rack were to lose power or connectivity, while storage components in other server racks may continue to operate within normal parameters. There is further shown as a conceptual representation various pieces of data (e.g. data objects or files, or stripes or chunks thereof) 111 to 113, 121 to 123, 131 to 133 and 141 to 143 that are stored within each storage component.

The placement of these pieces of data in the system shown in FIG. 1 is illustrative of one aspect of the instantly disclosed embodiment. For example, given 6 pieces of data 112, 113, 122, 123, 131 and 141 (e.g. 6 consecutive stripes of data that, when assembled together, comprising all of the data for a data object) and 4 storage components 110, 120, 130, 140 across 2 different higher-level failure domains 150, 160 (e.g. 1 SSD and 1 HDD in each of 2 communicatively connected server racks), there may be a constraint to place those pieces of data evenly across the available data storage components so as to balance the use of available storage resources across all the components. This can be satisfied, or met, by placing units 1 and 2 112, 113 in a first component 110, units 3 and 4 122, 123 in a second component 120, unit 5 131 in a third component 130, and unit 6 141 in a fourth component 140. Another constraint, relating to mirroring or redundancy may be implemented wherein replicas of each piece or data must be added to the system, but wherein no replica may be located on the same higher-level failure domain. A failure domain may include both the storage components themselves, but in this case the higher-level failure domain refers to the tray or server rack (shown conceptually as failure domains 150, 160). As such, the storage system may place replicas according to a number of equally effective arrangements and still meet the applicable constraints. Of course, there may be multiple levels of failure domains in any given system; as a purely illustrative example, the system may comprise a first set of racks or servers in a first facility and another set of racks or servers are located in another facility. As shown in FIG. 1, unit 5' 111, being a replica or mirror of unit 5 131, is placed in the first component 110 (which is in the first higher-level failure domain 150, which is a different higher-level failure domain from its replica), unit 6' 121, being a replica of unit 6 141, is placed in the second component 120 (also in the first failure domain 150), units 1' and 3' 132, 133 being replicas or mirrors of units 1 and 3 are placed in the third component 130 (which is in the second failure domain 160), and units 2' and 4' 142, 143 being replicas or mirrors of units 2 and 4 are placed in the fourth domain 140 (which is in the second failure domain 160). A further constraint that may have been implemented is that replicas, whose originals are located in the same higher-level failure domain, must be located on different sub-domains (i.e. any level of failure domain below the higher-level failure domain); since data unit 1 112 and data unit 2 113 are located on the same higher-level failure domain and failure sub-domain, their replicas, data unit 1'

132 and data unit 2' 142 must be located on a different failure sub-domain from each other. In other words, two replicas cannot share the same lowest-level failure domain, if corresponding replicas also share the same lowest level failure domain. The initial constraints, that is, enforcing a replication factor of at least 2, ensuring that no replicas are placed on the same failure domain (including sub-domains thereof), and that group of replicas should share the same lower-level failure domain if a set of corresponding replicas also shares the same lower-level failure domain.

As another illustrative example, a constraint may be implemented that requires matching data storage resources with the priority of data stored thereon. If the priority of a given data object changes priority, given temporal variations in priority for certain data (e.g. data relating to login credentialing at certain times when people tend to engage with a system) that renders the storage tier on which it currently resides in violation of such constraint, the system must determine an alternative arrangement of potentially all data objects currently stored in the system that, once the data object in question has been moved to a higher performing tier, will meet all hard constraints, meet an optimal number of soft constraints, and require a minimal performance cost to associate all the data objects with resources in accordance with an alternative arrangement. In embodiments, a constraint engine is running on the system, which is particularly configured to have high-speed, if not instantaneous awareness of the status of all the data storage nodes and failure domains, as well as the ability to provide instructions to implement alternative arrangements of data and resource associations. The constraint engine determines at least a plurality of alternative arrangements that will meet the requirements noted above, and then implements the changes necessary to cause the appropriate data-resources associations. This may include moving or copying data from one location to another, transferring a communications channel (e.g. a TCP endpoint-to-endpoint communication) from a first data storage component to a second data storage component that has the applicable data thereon (either because a replicate already existed there or because the data was moved or copied there prior to or concurrently with the move of the data connection), causing data processing to occur on another data storage component (again, on data corresponding to a process that was occurring or about to occur on a first data storage component), or a combination thereof.

Each component 110, 120, 130, 140 and tray 150 and 160 comprises connectivity and processing resources, shown conceptually as respective modules 115, 125, 135, 145, 155 and 165, which are themselves data resources (e.g. possibly both communications resources, such as a NIC or Ethernet or other network layer port, and a processing resource, such as a dedicated single or multi-core processor) and therefore possibly subject to constraints. In FIG. 1, the connectivity modules are communicatively coupled to permit the communication of information therebetween relating to data, data requests, and administrative instructions and information relating to the storage, communication and processing of the data storage system. Switch 170 may, in some embodiments interpose the data storage system and a communications network 180 upon which data clients may be communicatively coupled. The switch 170 may provide a single point of communication (e.g. addressable by a common address or set of addresses) to data clients (not shown). The switch 170 may also comprise or have access to the file system information that keeps track of the data that is stored (or associated for storage) at any given location within the system. It may also have both a forwarding plane and control plane operability, which may be implemented either as dedicated hardware or by software (e.g. as a SDN networking switch).

Referring to the exemplary system an assignment of data as shown in FIG. 1, the system is configured to, upon a change to the system, determine a reassignment of data resources in association with data units, and then implement such new arrangement in accordance with that reassignment. A number of non-limiting exemplary changes that could result in reassignment and placement will be considered here for illustration. The reassignment could occur resulting from a number of different kinds of changes to the data storage system. For example, if a new tray (in addition to the existing trays 150 and 160) is added to the system, and there is a constraint relating to the degree of balancing across data storage components, the system will re-distribute the data units across the new and old data storage components to obtain an optimal balancing of storage capacity usage (or if not optimal, an arrangement that could at least meet a given set of hard constraints, if any, relating to the degree of balancing). As a related example, if there is a failure of a data storage component, or indeed any failure domain, the data stored thereon, will need to be reassigned across the remaining failure domains in a way that all hard constraints continue to be met, and soft constraints are maximally in compliance. The system seeks to implement that reassignment in as few moves as possible or with minimal performance cost, depending on whether a weighting of specific moves or types of moves can be determined and accounted for in advance, and if there are multiple arrangements to reassign data to ensure compliance (and/or maximum compliance), the arrangements that would require the fewest steps (or lowest performance cost) to get from the current arrangement to the desired arrangement will be implemented. Additionally, there may be instances in which a reassignment may be selected, even though it is less optimal with respect to constraint compliance than another reassignment, the system may nevertheless select that reassignment since the number of steps and/or the performance cost to get from the current arrangement to the desired arrangement may warrant the sub-optimal reassignment.

As another example, if data units 1 and 2 112 and 113 become associated with a high degree of read requests, the system may reassign resources in accordance with applicable constraints; if there is a constraint that seeks to balance data requests (and responses) made to each data storage component, the system may determine that this constraint may be met by (a) moving or copying data unit 2 113 to data storage component 120 so that data requests for each of data unit 1 and 2 112 and 113 are communicated via a data path that is alternatively associated with different data storage component, thereby not overloading the communications resources of a first data storage component 110. Alternatively, the system may assign the communications data path for requests/responses associated with data unit 2 113 to the data storage component on which the replica of data unit 2 113, that is data unit 2' 142, is stored. The system may cause the data units to be associated with the resources that decreases latency and/or increases throughput of data requests (either through moving the data to a higher tier storage tier, using a faster or less busy network interface, a data storage component with a faster or less taxed data processor, or a combination thereof).

As another example, there may be data processing associated with on or more data storage component that, in addition to being used to handle data requests/responses, can be used to perform various storage-side data processing, such as indexing and compression (or indeed any data processing, including through the use of virtual processing unit, e.g. a docker, container, or VM instantiated within the data storage system). There may be a constraint that regulates the processing load on any give data storage component, wherein should the data processing load, as possibly measured by throughput or latency, associated with the processing component of any data storage component exceed a threshold, then data processing of data units stored thereon may be transferred to another data storage component that has available data processing capacity; the second data storage component may have a replica of the data unit(s) used in processing already stored thereon (which may therefore require fewer "moves" for the reassignment) or a copy of the data unit will need to be copied or moved thereto or a data access to a data storage component having the data units will be established.

While the above illustrative description of the arrangement of units of data is intended to provide an example of how data storage resources in the data storage system can be arranged to comply with a set of constraints, other types of resources may be utilized. For example, each data storage component may also have respective processors and network (or other communicative) interfaces, or access thereto—including access to shared processing and/or communications interfaces—which can be used as resources in respect of which an arrangement of resources can be determined and/or implemented that meets a set of pre-determined and dynamically implemented constraints, in the face of ongoing changes to the data storage system. Referring again to FIG. 1, the first data storage component 110 has shown conceptually associated therewith a processing (i.e. compute) component and communications interface, shown as a single module 115. Similarly, each of the second, third and fourth data storage components 120, 130 and 140 each may have either or both of processing and/or communications resources in modules 125, 126, 135, 136, 145 and 147. While these are shown in the conceptualized illustration as being a stand-alone and separate component for each data storage component, each data storage component, being a data storage resource, may share a common processor and/or processors and/or access thereto and/or a combination thereof with any one or more of the other data storage components. Likewise, each data storage component may share a common communications interface and/or access thereto and/or a combination thereof with other data storage component; for example, data storage components 110 and 120 may share communications and compute resources shown as module 155, associated with tray 150.

Figure 2:
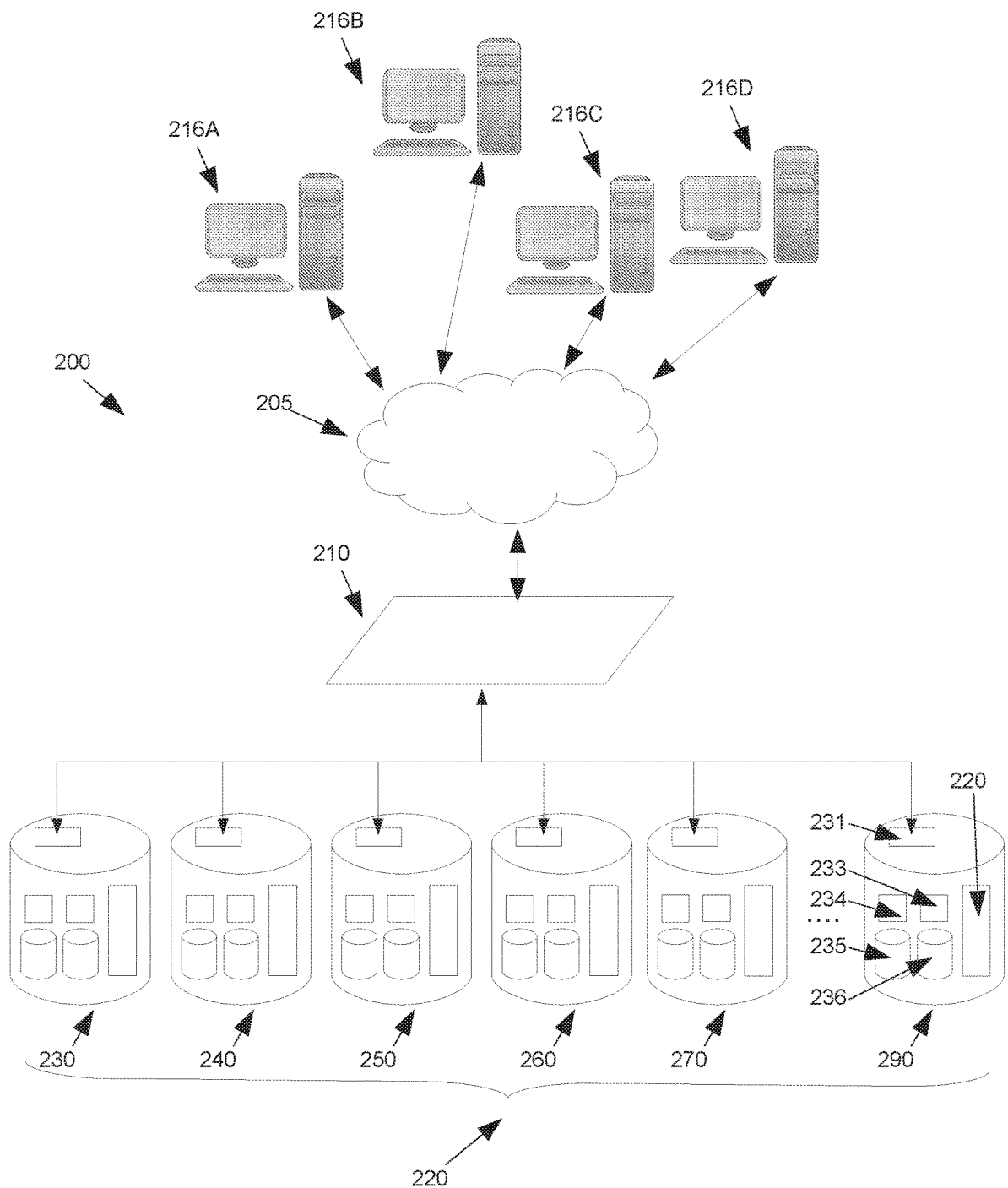
FIG. 2 is an illustration of an exemplary hardware configuration in accordance with another aspect of the instantly disclosed subject matter.

In one embodiment, a data storage system may be implements as a Coho Data™ data storage system, as depicted in FIG. 2. Referring to FIG. 2, there are one or more switching components 210, which may serve as a network interface for one or more data clients 216A to 216D, which interact with the data storage system 200 over a network 205 by sending and receiving data requests. Behind the switching component 210 there is a scalable bank 220 of n storage units 230, 240, 250, 260, 270 . . . 290. Each storage unit comprises of one or more communications interfaces 231 for communicating with other storage units and/or the switching component 210, at least one processing unit 232, and at least one storage component, wherein multiple storage components of varying types may be present (such as the two SSD units 233 and 234 and two spinning-disk hard drives 235 and 236). The SSD units may have their own network interface components (not shown) rendering them capable of directly communicating with other storage components in the same or other storage units or in other storage banks. Although not shown, there may be additional scalable storage banks configured to communicate via the same or different switching components 210 with the same or different data clients. The one or more scalable data storage banks may present as one or more logical storage units for one or more data clients. The data storage system, as such, provides for scalable data storage in which resources comprising data storage, network communication, and data compute resources (possibly, as a non-limiting example, configured to process data units stored within a data storage system) can be distributed in myriad different arrangements that may, for example, dynamically provide the most efficient data storage services as one or both of data requirements and the data storage system itself changes dynamically.

As the degrees of freedom associated with these arrangements increase, the number of possible arrangements of the usage of the data resources increases exponentially. Indeed, whether the arrangement of data with respect to only a single data resource, such as data storage, or concurrently on two or three types of data resources, the number of possible arrangements increases extremely rapidly. Different characterizations of any given data resource may increase the number of possible arrangements: number of storage devices, the number of storage tiers, or the number of storage domains (e.g. a flash device and a disk that reside on the same server). Some of the other degrees of freedom that may be considered in the context of constraints may include but are not limited to replication factor; the number, variety and size of data storage components; the size of the data units (e.g. very small stripes); whether striping has been used; whether and which levels and types of parity may be used; the availability and amount and variety of storage-side processing; the number of communications interfaces and interconnectivity between storage components; the availability of multiple network interface and processor queues (which may be available for prioritizing certain data or a class of data); the number of constraints; the existence and number of each of hard and soft constraints (i.e. first and second constraints); the locality of workloads and/or data streams associated with the data storage system; the number of data clients; and the degree to which priority of data changes and whether and how much such data may be promoted or demoted to differing storage tiers accordingly. Most of the preceding examples may arise by virtue of intended performance adjustments or improvements, but other degrees of freedom may be present that result from usage of a data storage system and possibly unintended occurrences, such as the number and breadth of failure domains and the number of occurrences of failure (where failure may include any unexpected reduction in performance and not just a failure to operate).

As such degrees of freedom increase, even by a relatively small number, the number of possible arrangement of resources-to-data associations in the data storage system, and the implementation of such resources for use in interacting with the data storage system and the data stored thereon, may in some embodiments become too high to consider each possible arrangement and the implications thereof on every constraint, without consuming an impracticable amount of time and/or computing resources. Additionally, there may be a variety of possible arrangements that may comply with all constraints, both hard and soft, and provide optimal performance, but would be associated with a performance cost for transitioning to one of such arrangements that implementing such a transition would minimize, delay, or eliminate the benefit of such arrangement. For example, a given workload may be of requisite priority that some additional performance benefits would be available by moving all data associated with the workload to flash on a given storage unit, particularly if that storage unit has a high speed processor which is not being used for other data processes (and for the purposes of this example the workload requires some degree of storage-side processing) and which has available network connectivity and/or a dedicated and available communications queue for high priority data transfer; however, the performance cost of making the necessary changes to transition the current arrangement of uses of the data storage system resources to the more optimal arrangement may overcome the benefits of such more optimal arrangement. Another somewhat less optimal arrangement may meet all constraints (or fail to meet some or all soft constraints to an acceptable degree) and require many fewer moves to achieve such an arrangement. If the latter arrangement may be implemented without exhausting the benefit of the change, for example by taking many hours during which the associated data may not be accessible, then it might be preferable even though the overall performance may not be as optimal as the former.

In embodiments of the system there may be a determination of, among other things, the fewest number of moves required to achieve another arrangement of the data storage system resources in which in the degree of compliance with constraints is acceptable. The number of moves required for a transition to another arrangement may be a constraint or used in determining such a constraint (i.e. where the maximum number of moves permitted may be weighted in accordance with the relative benefit associated with other arrangements). A move (i.e. a resource reassignment) may include the following non-limiting list of resource transitions: moving a copy of a data unit from one storage location to another storage location; changing to another existing replica of a given data unit to be used as the "live" or primary data unit; generating a new data unit or replica thereof in another storage location; associating a new or additional data storage location for use in connection with a set of data transactions; moving a communications connection from one data storage component to another data storage component (this may include making a given server "stateful" with respect to a data client without breaking and re-initiating a communications session); creating a new communications connection to another data storage location; moving a communications connection from one data port or queue association to another data port or queue association; moving storage-side data compute from a first processor to a second processor (which may or may not be accompanied by a move of data from storage local to the first processor to the second, by providing access to the second processor to storage associated with the first processor, by moving a Virtual Processing Unit ("VPU") such as a container, jail or virtual machine from the first processor to the second processor, or a combination thereof); or combinations thereof.

Depending on a specific arrangement of the use of such resources, the performance of data storage system will vary. Storing data on lower performing storage media, or storage tiers, may often result in reduced throughput and higher latency; processing data on devices that have slower processing times and/or are have reduced processing capacity and/or experiencing high processing demand at any given time, will also experience reduced throughput and/or higher latency; and communications interfaces, such as buses and NICs, that are saturated (or are approaching saturation) and/or can process fewer PDU in a given time will also experience reduced throughput and/or higher latency for sending PDU. For data sets and workloads having a lower priority (i.e. "cold" data), generally associated with infrequent accesses and/or a reduced requirement for high processing or communications performance (e.g. as may be measured by latency and/or high-throughput), such data may be associated in accordance with one or more constraints with resources that are not designated for high performance (e.g. put the data on spinning disks, compress the data or compress it more, and/or permit other data sets and workloads to take priority when competing for the same communications and/or compute resources). Conversely, higher priority data sets and workloads (e.g. "hot" data), generally associated with more frequent accesses and/or an increased requirement for high performance, such data may be associated in accordance with one or more constraints with resources that are designated for higher performance (e.g. put the data on flash, avoid any compression of the data, and/or designate such "hot" data sets and workloads to take priority when competing for the same communications and/or compute resources). Each of these associations may in some embodiments be set in accordance with one or more constraints set by the system, system administrator, a data client, or a user of the system.

The number of possible arrangements of resources for any given set of conditions and constraints at any given time can be significant, irrespective of whether every possible arrangement meets or is optimal with respect to any one or more constraints. The possible arrangements may increase exponentially (or super-exponentially) as additional degrees of freedom are added to the system, such as the number and different sizes and types of data chunks, the number of data clients, the number of data storage components and failure domains thereof, the range of operational or performance characteristics of storage, communication, or compute data resources, the number and permissible permutations of constraints, which data storage resources are constrained, etc. While one approach to determining the optimal arrangement and assignment of some or all resources is to determine every possible alternative arrangement of data resources in association with data and then select the alternative arrangement with the most optimal operation with respect to the constraints, such a solution becomes impractical as the degrees of freedom and the dynamism (e.g. the frequency, extent, and rate of changes being implemented) of the data storage system increases. Both the determining of the optimal arrangement, as well as the transition to such an arrangement from the current arrangement may become impracticable. Embodiments hereof implement various solutions to determine improved data storage resource arrangements that meet constraints optimally. The first is to generate a predetermined number of random "guesses" as starting points, or as initial or seed alternatives, for resource assignment distributed more or less equally across the domain of all possible arrangements that meet all constraints; in other cases, such seed or initial alternatives will be selected from a group of alternatives that at least comply with all or at least a first set of hard constraints. Beginning with such initial alternatives, the constraint engine would then calculate alternatives "near" such guesses and assess the degree of constraint compliance associated therewith with all constraints and, in some embodiments, the system load on transitioning to such alternative arrangement from the current arrangement. The "nearby" alternatives to the initial or seed arrangements are determined by incrementally and/or iteratively considering a change to one or more data resource assignments, and then determining how optimally such arrangement would meet all constraints, and then repeating for each seed arrangement. For each guessed starting point (e.g. seed or initial alternative), a predetermined number of alternatives could be assessed, or else each of some or all of the degrees of freedom may be iteratively changed until a predetermined metric associated with the potential alternative arrangements, such metric being associated with how optimally the constraints are met, begins to decrease (such method referred to herein as a local maximum search). The system would select from all the calculated alternatives the most optimal set of resource arrangements (wherein optimal may consider a system transitioning cost, e.g. number of transition steps, performance reduction from such transition steps as an aggregate or other determination), and then implement placement of such resource arrangement. The initial or seed arrangements may be selected because they meet a first set of constraints, or they meet some predetermined or calculated number of first constraints. In some embodiments, the initial or first set of constraints may be "hard" constraints, meaning that they must be in compliance to consider remaining in or moving to any arrangement of resources; alternatively, given that some constraints may comprise non-binary states of compliance, it may mean in some cases that a degree of compliance must be higher, or a range of compliance is narrower than, a corresponding degree or range of compliance for a second set of constraints.

In some aspects, there is disclosed a distributed data storage system for automatic constraint-based data resource arrangement. In some embodiments the data storage system may comprise a plurality of data storage components being communicatively coupled to each other. In some embodiments, this may include a plurality of servers that are used to store data; each server may comprise of a single type of data storage media, or in other cases one or more of the servers may support a plurality of different data storage media, each offering various performance characteristics. In other cases, the servers may provide other functionalities not limited to data storage. In some embodiments, the servers may operate cooperatively to provide a distributed functionality, such as but not limited to storing data in one or more file systems for one or more clients, providing web services, email services, and database services, across a plurality of the servers.

In some embodiments, the distributed servers may be interfaced with clients by a switch through which communications, such as data requests and responses thereto, are routed to and from said servers. Such a switch may expose a single or range of IP addresses (or other address, possibly depending on the network layer) for facilitating communications with the distributed system; in some such embodiments, this may support communications that are stateless between a client and the server, since the communications can be handled by any of the servers in the distributed system and can be transferred amongst servers without breaking a communication session (or at least not having to re-start with a loss of all progress) in a way that may or may not be visible to the client.

In some embodiments, a constraint engine operates to determine the placement of data so that the most optimal association exists between a given set of data, including the use requirements therefor, and the server resources having matching performance characteristics. Upon a change to the system, such as loss of a server or a storage medium thereon, storage or deletion of data, new data requests, network traffic, the system is configured to re-arrange data and/or the data resource assignments therefor to maintain optimal treatment of the data in the system. In embodiments, the optimal treatment takes into consideration the priority level of the data, and the performance requirements of the associated data resources that would be necessary to meet the priority requirements.

In some embodiments, a data storage component may comprise the following data resources: data storage media for storing client-related digital information, a data processor for processing said client-related digital information, and a network communications interface for communicating said client-related digital information. In general, a data storage component may be a data storage server that operates cooperatively or in association with other data storage servers to provide distributed data storage. In some embodiments, each data storage server may be configured to run virtual data storage devices. Systems disclosed herein are not limited to data storage systems, in which case other types of servers may be used in place of data storage components. In either case, virtual machines, containers, or dockers (or the like) can be instantiated on the servers or data storage components to offer services other than just data storage services. Physical resources across a plurality of the servers may be virtualized, through the use of hypervisors or virtual storage appliances instantiated on such servers that permit the distributed resources (including storage, communication or computing resources) to be presented as one or more virtual resources.

Various types of storage media capable of recording data may be used to take advantage of different relative performance characteristics (for example, the following non-limiting characteristics: cost, capacity, latency, throughout, power, TOPS, etc., or combinations thereof, such as capacity/cost, power/cost, IOPS/power, etc.). For example, it may include resources or media that are capable of having information, typically digital information, stored thereon and/or retrieved therefrom. A data storage medium can refer to any of the components, resources, media, or combination thereof, that retain data, including what may be historically referred to as primary (or internal or main memory due to its direct link to a computer processor component), secondary (external or auxiliary as it is not always directly accessible by the computer processor component) and tertiary storage, either alone or in combination, although not limited to these characterizations. Data storage media of the data storage components can include any physical memory resources accessible within the distributed computing system. It may in some embodiments include primary memory resources that are directly accessible to a computer processor component, such as, but not limited to, RAM, registers, and cache memory. In some embodiments, these components may include one or more secondary memory resources that are not as directly accessible by a computer processor, including hard disk drives, optical discs, SSDs, electronic discs, flash memories, floppy drives, and magnetic tapes or drives, among other physical media that would be known to a person skilled in the art. Data storage media may be based on any of the following non-limiting examples of data storage: RAM (Random Access Memory), SRAM (Static Random Access Memory), DRAM (Dynamic Random Access Memory), SDRAM (Synchronous Dynamic Random Access Memory), CAM (Content-Addressable Memory), or other rapid-access memory, or more longer-term data storage that may or may not provide for rapid access, use and/or storage, such as a hard disk drive, flash drive, optical drive, SSD, other flash-based memory, PCM (Phase change memory), or equivalent. Other data storage resources may include micro-Arrays, Network-Attached Disks and SAN.

The data storage media may be considered to have any of a number of storage and storage performance characteristics that would be known to persons skilled in the art, which may vary broadly. These may include, without limitation, the volatility of a data storage resources (which can be used to describe the ability for data storage resources to store data during periods with and without a supply of electrical power), persistence (the ability to store data when a given process has ended), whether memory is dynamic or static (an indication of whether memory requires that information be refreshed, re-read or re-written in order to persist), mutability (capability of memory to use the same resources for both reading and writing information, read-only, or variations in speed of reading and writing relative to one another, e.g. information may be written to flash memory slowly but read much more quickly), accessibility (random access to data storage resources on a given memory component versus sequential access), addressability (describing whether units of data storage resources are addressable according to their location on a memory component, existence within a file structure for which, for example, an operating system associated with the physical computing device provides a file system abstraction to provide storage location information, or content-addressable in which the content of the information is used to determine, among other possible characteristics, an address for storage), capacity (including overall capacity and density characteristics), speed or performance (including the latency, which refers to the time a memory component takes to access a memory location, and throughput, which can be used to refer to a number of data storage requests/responses that can be handled per unit time or unit of memory or other unit), reliability (the degree to which memory instructions, such as read, write, update, can be carried out without error), cost, and energy use (which would describe the overall energy consumption used by a memory component and whether a component may have capabilities to reduce energy usage during, for example, periods of activity or of inactivity). In some embodiments, data storage resources may have any number of other characteristics not disclosed herein that impact the provision of data storage resources but would still be within the scope of the subject matter disclosed herein provided the system can, as a general matter, associate different memory device characteristics with different physical or memory components, and then adapt modes of utilization, such as methods of implementing memory instructions, to adjust or control such characteristics.

In some embodiments, there is provided a constraint engine for automatically determining alternate arrangements of said data resource assignments, as well as the degree such alternate arrangements are in compliance with applicable constraints. The constraint engine may also continually, in real time, periodically, or upon a triggering event (such as change to one or more system characteristics) determine compliance, and/or the degree of compliance, with constraints. The constraint engine in some embodiments comprises its own constraint processor for determining, in association with stored instructions for carrying out such determination, levels of compliance associated with current and alternative arrangements of resources, alternative arrangements, as well as the state of current operations of the distributed computing system and its requisite components and connections. The constraint engine may in some embodiments comprise its own constraint database in local storage, or it may comprise of access to such database. The constraint database is configured to receive and store changeable digital constraint parameters indicative of permissible operational constraints on the data resources of the system; for example, replication factors of identifiable data sets, degree of shareable failure domains, data or workload priority, threshold values or ranges of performance characteristics of any data resources (for storage, connect, or compute resources, or any combination thereof), as well as other constraints. The constraint engine should be configured to have access to the operating characteristics of all of the data storage components (either directly or indirectly), as well as the appropriate processing capabilities to process a high number of calculations rapidly. In some cases, the constraint engine may be configured to issue instructions for implementing an alternative arrangement, and in other cases it may provide the instructions for another component of the system to implement (or cause to be implemented). The instructions may be provided in bulk or otherwise. In embodiments, the constraint engine may have high performance data connectivity (direct or indirect) with all the servers; this permits the constraint engine to have real-time, or near-real-time, status updates of all of the data storage components and data resources associated therewith, as well as to issue commands relating to the re-arrangement of data and data resource arrangements and implementation thereof.

In embodiments, alternate arrangements should comply with at least a first set of said changeable digital constraint parameters. Such first set may be considered to be "hard" constraints, meaning that compliance therewith is mandatory. Other sets of constraints may not necessarily be mandatory in order for a given arrangement to be considered or maintained, but may have preferable or permissible degree of compliance.

In some embodiments, data resource assignments may be reassigned from a current arrangement in accordance with a selected one of said alternate arrangements upon an operational change to said data storage system. The operational change to the system may include any change to the system such as addition or removal of a system component (i.e. a data storage component in a data storage system), due to new servers being added to increase or decrease, for example, capacity, redundancy, throughput (storage, communications or compute), latency, or other operational characteristic of a given system. The ability to increase or decrease any of these characteristics may be associated with matching data and data resources most optimally, particularly as different data will have different priority (and such priorities may change over time).

A component may be removed due to system failure, or due to an excess of an operational characteristic, such as capacity. In other cases, an increase or decrease in client traffic, or a change in the characteristics of the data associated with such traffic, can be considered a change that could result in the system transitioning to an alternative arrangement (or indeed determining other possible arrangements). This may result or include the addition or removal of data from the system, an increase or decrease in processing requirements, a change in data prioritization, or an increase or decrease in PDUs (and PDU size) being communicated into or out of the system. In some embodiments, the constraint engine may as result of the change initiate one or both of the alternate arrangement determination, or cause or trigger the implementation of a selected alternate arrangement. The change may also include the addition or removal of constraints, or the tightening or relaxation of compliance with constraints (e.g. making a "soft" constraint into a "hard" constraint, or vice versa). In some cases, the constraint engine may continually be determining alternate arrangements, or other events may trigger such determination (e.g. a scheduled time period, a request by an administrator or other entity). During or prior to determining the alternate arrangements, the constraint engine may send one or more requests to the constraint database to obtain information relating to applicable constraints; it may store that information in local primary memory, or it may query that information when needed.

In some embodiments, a hierarchy of constraints may be used wherein the initial starting point guesses are selected from arrangements in which the constraints highest in the constraint hierarchy are met, and then alternative arrangements "near" such starting points are calculated (possibly by calculating a predetermined number of alternatives for each starting point, or performing a local maximum search). The system would select from all the calculated alternatives the most optimal set of resource arrangements, and then implement placement of such resource arrangement. In some embodiments, such a hierarchy may indicated that there are "hard" and "soft" constraints (or first and second); in other embodiments, there may be many more levels of constraints, either amongst or between different sets of constraints, wherein each constraint in the hierarchy may have a compliance priority over other constraints. In some embodiments, the system would prefer arrangements that have greater levels of compliance of constraints that are higher in the hierarchy of constraints. In an exemplary embodiment, one could consider a situation in which there may be a number of alternative arrangements that are in compliance with a set of "hard" constraints, and have very similar levels of compliance with a set of "soft" constraints; selecting between the number of possible alternative arrangements may be useful by looking at whether any of those arrangements in compliance with the first set or the second set, or both, are preferential based on the relative position in the constraint hierarchy of the applicable constraints, hard or soft. The number of reassignments to transition from a current arrangement to an alternate arrangement may be also be considered when considering between multiple alternate arrangements that are otherwise equally compliant.

In one embodiment, optimal arrangements of resource assignments are determined by a constraint engine, which determines a plan to reconfigure the layout of the data storage resources. The data storage system then implements the plan by reassigning data storage resources for use in association with applicable data (e.g. data and/or replicas thereof are moved from one data storage resource component or sub-component to another component or sub-component; client connectivity to data storage components are re-assigned; and data processors are re-assigned for data compute). In some embodiments, the constraint engine may repeat this process after such implementation and/or additional changes impact the system.

Figure 4:
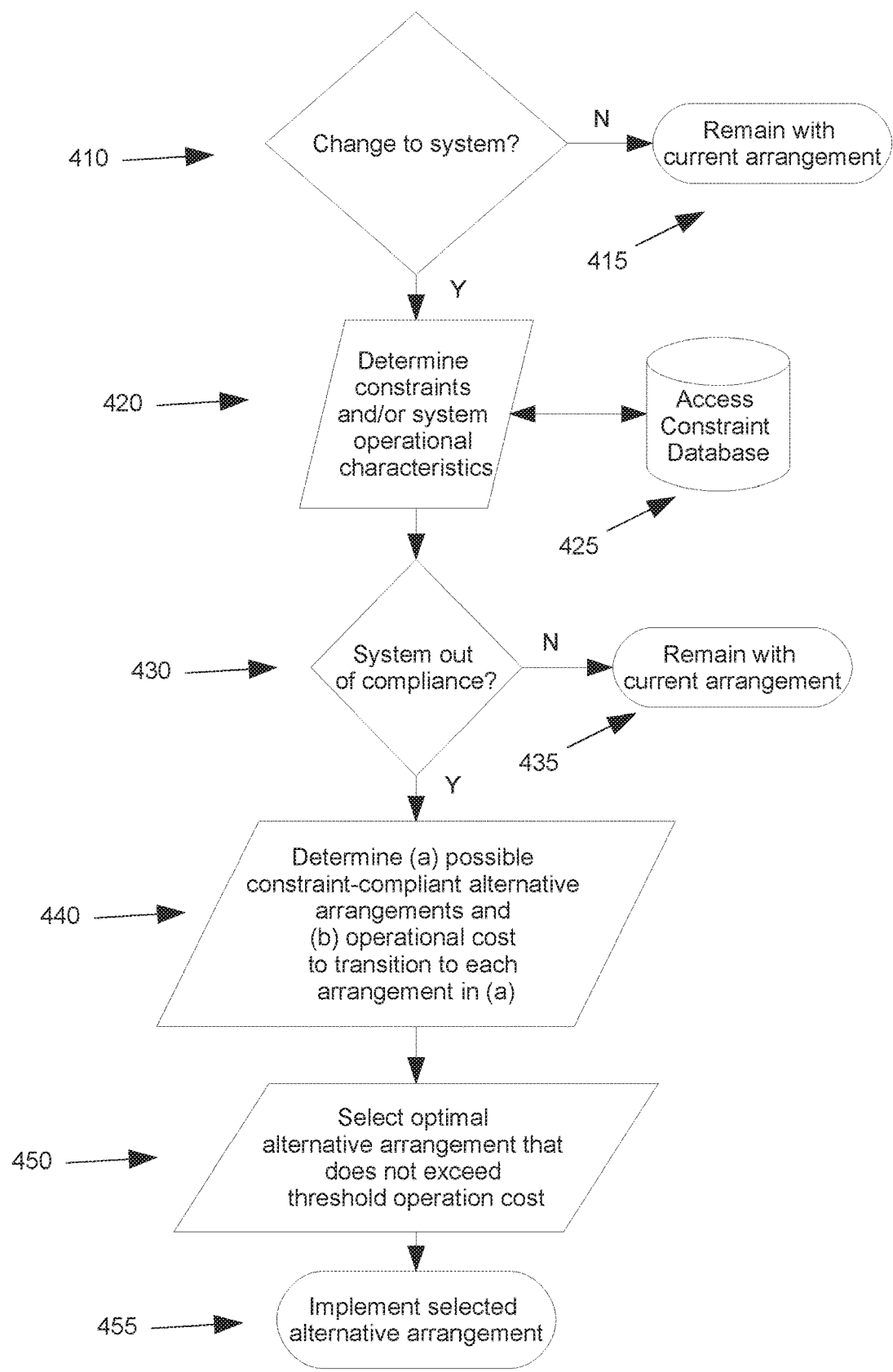
FIG. 4 is a flowchart of an exemplary method in accordance with another aspect of the instantly disclosed subject matter.

With reference to FIG. 4, there is provided a method of dynamically implementing constraint-based assignment of data resources in a distributed data storage system, the data storage system comprising a plurality of interoperable data storage resources and a resource constraint engine, the method comprising the steps: If there is a change to the system 410, obtain at step 420, if not already in memory, from the constraint database 425 constraint information and, from the system, information pertaining to the operation of the data storage components, data resources, and possibly other aspects of the system impacting performance; determine at step 430, by the constraint engine and based upon said constraint and operational performance information, whether the system is out of compliance with the retrieved constraints; if not, do not implement a change to the system 435 and the process may stop; else, in some cases utilizing constraint matching parameters indicative of constraint compliance for one or more resources used in association with data, determining at step 440 (a) compliance of at least one other alternative arrangement of data and data resources, and (b) in some embodiments, the process cost for transitioning from a current arrangement for the at least one other alternative arrangement; select, at step 450, the most optimal alternative arrangement that does not exceed a given threshold for performance cost relating to the transition (in some embodiments, such threshold may comprise a set of thresholds that related to specific alternative arrangements where a given arrangement may have a threshold that is based upon the improvement in constraint compliance and/or operational benefit, so that the cost of transitioning can be balanced against the relative operational improvement); at step 455, the constraint engine implements said selected arrangement by transitioning, step by step, the use of each data resources in association with given data in accordance with the selected arrangement.

In another embodiment, there is provided a constraint engine for determining arrangements of data resource assignments for use in a distributed data storage system, and corresponding constraint matching parameters associated with each arrangement, the constraint engine comprising: a data communications interface for communicating instructions to a plurality of distributed data storage components relating to assigning uses of data resources in the distributed data storage components; and a data processor for determining at least a portion of all possible arrangements of data storage resources that at least meet a set of changeable data storage system constraints.

In another embodiment, there is provided a method of determining at least a portion of all possible arrangements of data resource uses in a data storage system, wherein all possible arrangements at least meet a set of changeable data storage system constraints, the method comprising the steps of: accepting a subset of the set of changeable data storage constraints that must be met; selecting a predetermined number of seed arrangements from the set of all possible arrangements that meet the accepted subset of changeable data storage constraints; assessing, for each selected seed arrangement, a plurality of related arrangements that would result upon transitioning at least one data resource to another use in association with data associated with the data storage system; incrementally repeating said assessment step to determine additional related arrangements until the subset of the set of changeable data storage constraints is no longer met for a given assessment; and calculating at least one local optimal arrangement from each of the plurality of related arrangements, wherein a local optimal arrangement includes any arrangement which is characterized by a higher degree of compliance with the set of changeable data storage constraints than other arrangements assessed from the same selected seed arrangement.

Figure 3:
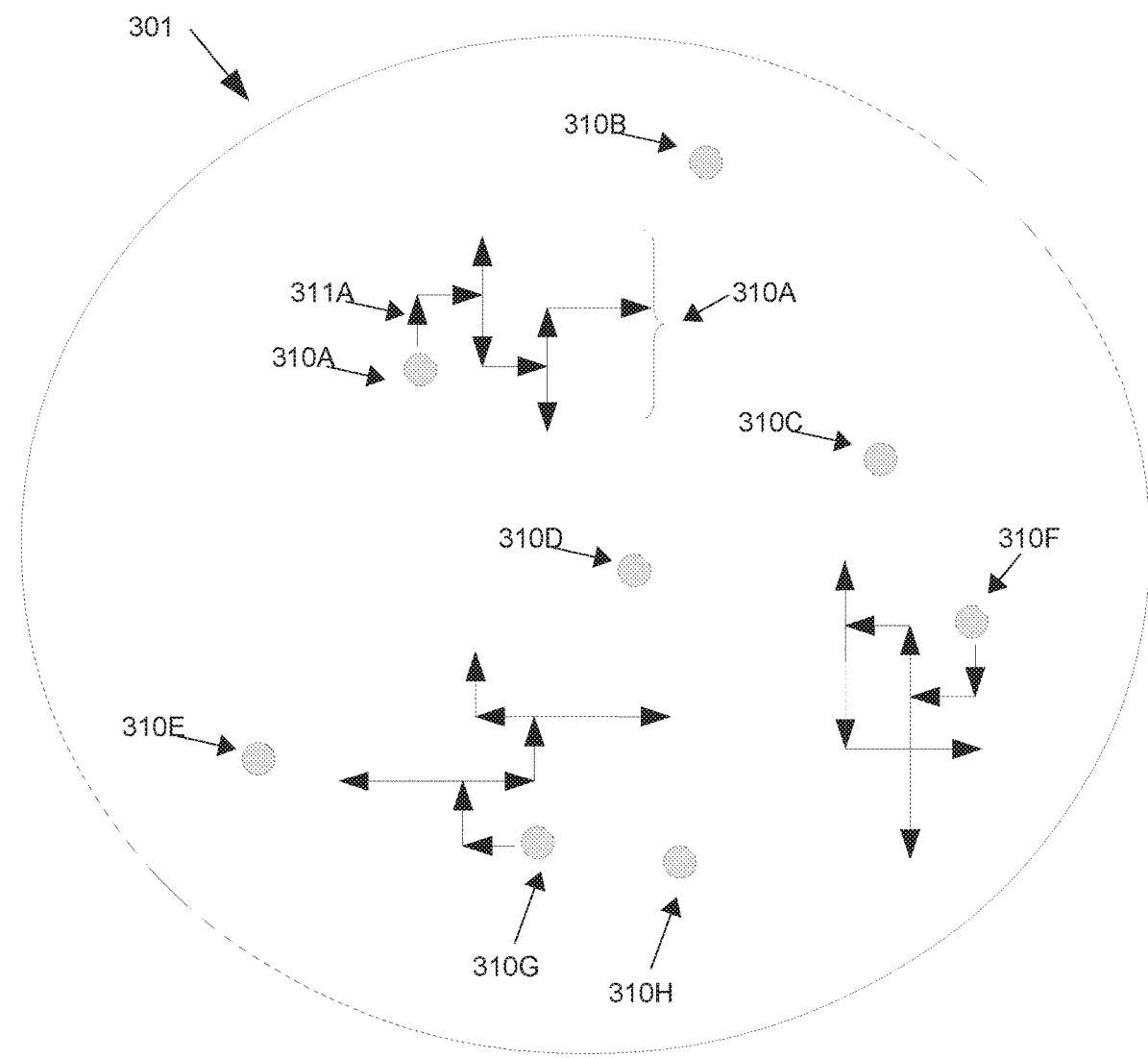
FIG. 3 is a diagram of a method of determining alternative arrangement of data and data resource assignments in accordance with another aspect of the instantly disclosed subject matter.

Referring to FIG. 3, there is shown a conceptualization of a method of determining alternative arrangements in accordance with the subject matter disclosed herein. There are a finite number of possible arrangements, shown conceptually as solution space 301, as all of the arrangements of the associations of data units to: the available data storage media on servers in the system; the available communications interfaces on each server on which to receive and to respond to client requests; and of computing resources on different servers for carrying out data or client request processing on different servers While this number is theoretically finite, it may be impracticably large to determine all such arrangements; indeed, many of them may present solutions that are otherwise compliant with all constraints, but would result in a reassignment that is impracticable to achieve in that it would take hours or days to complete all reassignment steps safely. In order to obtain a practical number of solutions that have appropriate compliance with the applicable constraints, the constraint engine first calculates a plurality of "seed" or initial alternative arrangements 310A through 310G. These initial alternate arrangements may be distributed more or less evenly across the solution space 301. The initial or "seed" alternate arrangements 310A through 310G will have all "hard" constraints in compliance. For each of the "seed" alternate arrangements 310A through 310G, or possibly a subset thereof, the constraint engine will determine the number of steps required to reassign each resource assignment in the current arrangement to that required in the applicable "seed" arrangement as well as the compliance of "soft" constraints. As an iterative and/or parallel process, for each or some of the "seed" alternate arrangements 310A through 310G, as exemplified in FIG. 3 by seed arrangement 310A, the constraint engine repeats the process by changing one or a predetermined number of the resource assignments associated with each initial estimate alternate arrangement, conceptually shown by arrow 311A, and then repeats the determination of the number of reassignment steps and constraint compliance and if there is an improvement in constraint compliance, shown conceptually as cluster of arrows 312, it will continue to iterate through the same resource assignment (or set thereof) until the constraint compliance begins to decrease or in some embodiments is associated with a threshold decrease in magnitude and/or rate of change, such threshold being in some cases a tunable parameter by an administrator or the system itself; the constraint engine may then repeat the same steps for additional resource assignments (or sets thereof) once an optimal or acceptable constraint compliance level has been achieved for a given resource assignment (or set thereof). These steps may be repeated in some embodiments until a local maximum for either or both of the number of reassignment steps and constraint compliance (or a combined value, which may be weighted in favour of one of them), or a minimum threshold reduction or improvement of these values is achieved for a given initial estimate alternate arrangement. The entire process may then be repeated for each of the initial estimate alternate arrangements, wherein the arrangement that achieves the optimal constraint compliance with the fewest or acceptable number of reassignment steps is selected. In many embodiments, there may be a threshold limit on the number of allowable reassignment steps to move to an alternate resource arrangement; this threshold may be related to the primary (or secondary, tertiary, etc.) purpose or function of the distributed computing system, or of such a purpose or function of a particular data set. The reassignment threshold may also be a function of the level of constraint compliance or improvement thereof (e.g. a higher number of reassignment steps may be permitted for a higher improvement in constraint compliance). There may also be windows of time, such as when any one or more of data request traffic, data storage capacity, compute capacity, and communications resource capacity may provide an opportunity for a higher number of reassignment steps that will not unduly burden the distributed computing system during a transition from a current arrangement to an alternate arrangement. This may include a weekend or overnight, for example.

In some embodiments, portions of the hosts within distributed computing system (e.g. servers or data storage components) may be partitioned for a given set of data or set of data request traffic. The partitioning may be both a physical partitioning, for example by associating a specific group of data storage components or data resources for a given function or data set; in other cases, the partitioning may be virtualized. In some embodiments, the methods and systems described herein may be applied for a specific subset of data associated with computing resources in a distributed computing system, without impacting the placement of other subsets associated with or sharing some of the same computing resources such a distributed computing system. For example, data associated with a given client or set of clients may have differing constraints associated therewith, and based upon changes to the system, such as an increase in data traffic or change in priority of the requests associated therewith—or any other types of changes to the system, it might make sense to rearrange the data stored in the system associated with the applicable set of data with respect to the available storage, compute and communications resources, without making any such rearrangement to other data sets. In some cases, the same distributed computing system may be used for a number of different enterprise clients, or subsets of clients; as such, when the needs of one set of clients (or the ability of the computing system to meet those needs changes), some embodiments may permit the rearrangement of a subset of the data associated with a given system, without making any changes to any other subset of data stored therein.

In embodiments, the distributed computing system may comprise of data storage systems, which in turn comprise of the following: at least one data storage component, wherein each at least one data storage component comprises at least one physical data storage resource and at least one data processor; in some embodiments, the data storage systems may further comprise a switching component for interfacing the at least one data storage components with data clients, possibly over a network. In embodiments, a plurality of data storage components can operate together to provide distributed data storage wherein a data object store is maintained across a plurality of data storage resources and, for example, related data objects, or portions of the same data object can be stored across multiple different data storage resources. By distributing the data object store across a plurality of resources, there may be an improvement in performance (since requests relating to different portions of a set of client data, or even a data object, can be made at least partially in parallel) and in reliability (since failure or lack of availability of hardware in most computing systems is possible, if not common, and replicates of data chunks that form part of the data in the data object store can be placed across the distributed data storage components on different hardware). Recent developments have seen distributed data storage systems comprise of a plurality of scalable data storage resources, such resources being of varying cost and performance within the same system. This permits, for example through the use of SDN-switching and/or higher processing power storage components, an efficient placement of storage of a wide variety of data having differing priorities on the most appropriate data storage tiers at any given time: "hot" data (i.e. higher priority) is moved to higher performing data storage (which may sometimes be of relatively higher cost), and "cold" data (i.e. lower priority) is moved to lower performing data storage (which may sometimes be of lower relative cost). Depending on the specific data needs of a given organization having access to the distributed data storage system, the performance and capacity of data storage can scale to the precise and customized requirements of such organization, and in some cases the system may be adapted to meet the temporal variations in the requirements of such organization. Such systems have processing power by increasing and customizing "storage-side" processing. By implementing virtualized processing units on the storage side, a high degree of utilization of the processing power of storage-side processors becomes possible, putting processing "closer" to live data.

In some embodiments, a data storage component may include both physical data storage components, as well as virtualized data storage components instantiated within the data storage system (e.g. a VM). Such data storage components may be referred to as a data storage node, or, more simply, a node. A virtual data storage component may be instantiated by or on the one or more data processors as a virtualized data storage resource, which may be embodied as one or more virtual machines (hereinafter, a "VM"), virtual disks, or containers. The nodes, whether physical or virtual, operate together to provide scalable and high-performance data storage to one or more clients. The distributed data storage system may in some embodiments present, what appears to be from the perspective of client (or a group of clients), one or more logical storage units; the one or more logical storage units can appear to such client(s) as a node or group of nodes, a disk or a group of disks, or a server or a group of servers, or a combination thereof. In some embodiments, the entire data storage system may be exposed behind and single IP address or a specific range of IP addresses. Other network level addresses can be used; the client may be provided with a specific address or range of addresses that will cause data traffic to arrive at the system, whereupon such traffic may be managed with or without transparency of such management to the client. Such logical unit(s) may in fact be a physical data storage component or a group thereof, a virtual data storage component or group thereof, or a combination thereof. The nodes and, if present in an embodiment, the switching component, work cooperatively in an effort to maximize the extent to which available data storage resources provide storage, replication, customized access and use of data, as well as a number of other functions relating to data storage. In general, this is accomplished by managing data through real-time and/or continuous arrangement of data (which includes allocation of storage resources for specific data or classes or groups of data) within the data object store, including but not limited to by (i) putting higher priority data on lower-latency and/or higher-throughput data storage resources; and/or (ii) putting lower priority data on higher-latency and/or lower-throughput data storage resources; and/or (iii) co-locating related data on, or prefetching related data to, the same or similar data storage resources (e.g. putting related data on higher or lower tier storage data from the object store, where "related" in this case means that the data is more likely to be used or accessed at the same time or within a given time period); and/or (iv) re-locating data to, or designating for specific data, "closer" or "farther" data storage (i.e. where close or far refers to the number of network hops) depending on the priority of the data; and/or (v) replicating data for performance and reliability and, in some cases, optimal replica selection and updating for achieving any of the aforementioned objectives.

In general, each data storage component comprises one or more storage resources and one or more processing resources for maintaining some or all of a data object store. In some embodiments, a data storage component may also be communicatively coupled to one or more other data storage components, wherein the two or more communicatively coupled data storage components cooperate to provide distributed data storage. In some embodiments, such cooperation may be facilitated by a switching component, which in addition to acting as an interface between the data object store maintained by the data storage component(s), may direct data requests/responses efficiently and dynamically allocate storage resources for specific data in the data object store.

As used herein, the term "virtual," as used in the context of computing devices, may refer to one or more computing hardware or software resources that, while offering some or all of the characteristics of an actual hardware or software resource to the end user, is an emulation of such a physical hardware or software resource that is instantiated upon physical computing resources. Virtualization may be referred to as the process of, or means for, instantiating emulated or virtual computing elements such as, inter alia, hardware platforms, operating systems, memory resources, network resources, hardware resource, software resource, interfaces, protocols, or other element that would be understood as being capable of being rendered virtual by a worker skilled in the art of virtualization. Virtualization can sometimes be understood as abstracting the physical characteristics of a computing platform or device or aspects thereof from users or other computing devices or networks, and providing access to an abstract or emulated equivalent for the users, other computers or networks, wherein the abstract or emulated equivalent may sometimes be embodied as a data object or image recorded on a computer readable medium. The term "physical," as used in the context of computing devices, may refer to actual or physical computing elements (as opposed to virtualized abstractions or emulations of same).

In embodiments, a data storage component comprises at least one data storage resource and a processor. In embodiments, a data storage component may comprise one or more enterprise-grade PCIe-integrated components, one or more disk drives, a CPU and a network interface controller (NIC). In embodiments, a data storage component may be described as balanced combinations of, as exemplary subcomponents, PCIe flash, one or more 3 TB spinning disk drives, a CPU and 10 Gb network interface that form a building block for a scalable, high-performance data path. In embodiments, the CPU also runs a storage hypervisor that allows storage resources to be safely shared by multiple tenants over multiple devices and in accordance with multiple protocols. In some embodiments, the hypervisor may also be in data communication with the operating systems on other data storage components in the distributed data storage system, and can present virtual storage resources that utilize physical storage resources across all of the available data resources in the system. The hypervisor or other software on the data storage components and the optional switching component may be utilized to distribute a shared data stack. In embodiments, the shared data stack may comprise a TCP (or other communications protocol) connection with a data client, wherein the data stack is passed amongst or migrates to and from data server to data server. In embodiments, the data storage component can run software or a set of other instructions that permit the component to pass the shared data stack amongst itself and other data storage components in the data storage system; in embodiments, the network switching device also manages the shared data stack by monitoring the state, header, or content (i.e. payload) information relating to the various protocol data units (PDU) associated with communications with the data storage (or indeed other computing system), and then modifies such information, or else passes the PDU to the data storage component that is most appropriate to participate in the shared data stack (e.g. because the requested data or a replica thereof is stored at that data storage component).

In embodiments, the storage resources may comprise a variety of different types of computer-readable and computer-writable storage media. In embodiments, a data storage component may comprise a single storage resource; in alternative embodiments, a data storage component may comprise a plurality of the same kind of storage resource; in yet other embodiments, a data server may comprise a plurality of different kinds of storage resources. In addition, different data storage components within the same distributed data storage system may have different numbers and types of storage resources thereon. Any combination of number of storage resources as well as number of types of storage resources may be used in a plurality of data storage components within a given distributed data storage system. Exemplary types of memory resources include memory resources that provide rapid and/or temporary data storage, such as RAM (Random Access Memory), SRAM (Static Random Access Memory), DRAM (Dynamic Random Access Memory), SDRAM (Synchronous Dynamic Random Access Memory), CAM (Content-Addressable Memory), or other rapid-access memory, or more longer-term data storage that may or may not provide for rapid access, use and/or storage, such as a hard disk drive, flash drive, optical drive, SSD, other flash-based memory, PCM (Phase change memory), or equivalent. Other memory resources may include uArrays, Network-Attached Disks and SAN.

In embodiments, data storage components, and storage resources therein, within the data storage system can be implemented with any of a number of connectivity devices known to persons skilled in the art. In embodiments, flash storage devices may be utilized with SAS and SATA buses (.about.600 MB/s), PCIe bus (.about.32 GB/s), which support performance-critical hardware like network interfaces, GPUs or buses, or other types of communication systems that transfer data between components inside a computer, or between computers. In some embodiments, PCIe flash devices provide significant price, cost, and performance trade-offs as compared to spinning disks. The table below shows typical data storage resources used in some exemplary data servers.

|  | Capacity | Throughput | Latency | Power | Cost |
|---|---|---|---|---|---|
| 15K RPM Disk | 3TB | 200 IOPS | 10ms | 10W | $200 |
| PCIe Flash | 800GB | 50,000 IOPS | 10µs | 25w | $3000 |

In embodiments, PCIe flash may be about one thousand times lower latency than spinning disks and about 250 times faster on a throughput basis. This performance density means that data stored in flash can serve workloads less expensively (as measured by TO operations per second; using the above exemplary data, 16.times. cheaper by IOPS) and with less power (100.times. fewer Watts by TOPS). As a result, environments that have any performance sensitivity at all should be incorporating PCIe flash into their storage hierarchies (i.e. tiers). In an exemplary embodiment, specific clusters of data are migrated to PCIe flash resources at times when these data clusters have high priority (i.e. the data is "hot"), and data clusters having lower priority at specific times (i.e. the data clusters are "cold") are migrated to the spinning disks. In embodiments, performance and relative cost-effectiveness of distributed data systems can be maximized by either of these activities, or a combination thereof. In such cases, a distributed storage system may cause a write request involving high priority (i.e. "hot") data to be directed to available storage resources having a high performance capability, such as flash (including related data, which are associated with a higher likelihood of being requested or accessed at the same or related times and can therefore be prefetched to higher tiers prior to such times); in other cases, data which has low priority (i.e. "cold") is moved to lower performance storage resources (likewise, data related data to that cold data may also be demoted). In both cases, the system is capable of cooperatively diverting the communication to the most appropriate storage node(s) to handle the data for each scenario; for example, in the case where different replicates of the same data are stored on different storage tiers, associated data traffic can be forwarded to the replicate on the storage tier that best meets the priority of the data or data stream (and/or the replicate associated with the compute and/or communication resource that best meets the priority of the data or data stream). In other cases, if such data changes priority, some or all of it may be transferred to another node (or alternatively, a replica of that data exists on another storage node that is more suitable to handle the request, because it has more appropriately performing storage media, communications interfaces, or computing resources); in other words, this change in priority may give rise to a need to rearrange the placement of the data, or alternatively the arrangement of data-to-data resources, in the system to improve the constraint compliance. The switch and/or the plurality of data storage components (i.e. nodes) can cooperate to participate in a communication that is distributed across the storage nodes deemed by the system as most optimal to handle the response communication; the client may, in some embodiments, remain "unaware" of which storage nodes are responding or even the fact that there are multiple storage nodes participating in the communication (i.e. from the perspective of the client, it is sending client requests to, and receiving client request responses from a single logical data unit at a single address on the network). In some embodiments, the nodes may not share the distributed communication but rather communicate with each other to identify which node could be responsive to a given data request and then, for example, forward the data request to the appropriate node, obtain the response, and then communicate the response back to the stateful or active data client.

In some embodiments, there may be provided a switching component that provides an interface between the data storage system and the one or more data clients, and/or clients requesting data analysis (or other application-layer processing). In some embodiments, the switching component can act as a load balancer for the nodes, as well as the resources available thereon. For example, traffic may be balanced across multiple nodes so that the communications resources are not overloaded, but in the event that there are data storage processes being carried out on one or more data storage component, the switch may distribute requests relating thereto to the most appropriate nodes for processing. Embodiments hereof are not limited to switching components that are an L2 device (sometimes referred to by persons skilled in the art as a switch); in some embodiments, the switching component may constitute an L3 device (sometimes referred to as a router); indeed, the switching device is not limited to architecture associated with a specific network layer.

In some embodiments, data processing within the distributed computing system are carried out by one or more VPU running on one or more of the data storage components (or other servers within the distributed computing system). In some embodiments, the switching component selects the least loaded VPU to which it sends data request/data processing traffic. In other cases, the nodes themselves may determine that VPU should be offloaded to processing resources on other nodes and can then pass the shared connection to the appropriate nodes. In some exemplary embodiments, the switching component uses OpenFlow™ methodologies to implement forwarding decisions relating to data requests or other client requests. In some embodiments, there are one or more switching components, which communicatively couple data clients with data storage components. Some switching components may assist in presenting the one or more data servers as a single logical unit; for example, as one or more virtual NFS servers for use by clients. In other cases, the switching components also view the one or more data storage components as a single logical unit with the same IP address and communicates a data request stack to the single logical unit, and the data storage components cooperate to receive and respond to the data request stack amongst themselves.

Exemplary embodiments of network switching devices include, but are not limited to, a commodity 10 Gb Ethernet switching device as the interconnect between the data clients and the data servers; in some exemplary switches, there is provided at the switch a 52-port 10 Gb Openflow-Enabled Software Defined Networking ("SDN") switch (and supports 2 switches in an active/active redundant configuration) to which all data storage components (i.e. nodes) and clients are directly or indirectly attached. SDN features on the switch allow significant aspects of storage system logic to be pushed directly into the network in an approach to achieving scale and performance.

In embodiments, the one or more switches may support network communication between one or more clients and one or more distributed data storage components. In some embodiments, there is no intermediary network switching device, but rather the one or more data storage components operate jointly to handle client requests and/or data processing. An ability for a plurality of data storage components to manage, with or without contribution from the network switching device, a distributed data stack contributes to the scalability of the distributed storage system; this is in part because as additional data storage components are added they continue to be presented as a single logical unit (e.g. as a single NFS server) to a client and a seamless data stack for the client is maintained. Conversely, the data storage components and/or the switch may cooperate with each other to present multiple distinct logical storage units, each of such units being accessible and/or visible to only authorized clients, each exposed by a unique address or range of addresses (e.g. IP or MAC address).

As used herein, priority of data generally refers to the relative "hotness" or "coldness" of such data, as a person skilled in the art of the instant disclosure would understand these terms. The priority of data may refer herein to the frequency or likelihood that such data will be requested, written, updated, or otherwise interacted with, at the current or in an upcoming time interval. In the past, recency of usage has been employed as a proxy for priority. For example, the most recently used data, and storage blocks near such data, is kept in or prefetched to higher tier memory; however, temporal and spatial access patterns may fluctuate independently of the actual data priority and so this is often an improper way to prioritize data to higher tier memory. Indeed, demoting recently used data that is nevertheless cold (i.e. of lower priority) to, for example, spinning disk from flash so that the flash can accept data that is in fact much higher in priority is often just as important as promoting hot data to flash from disk. Similarly, the priority of an application-specific process being carried out by a VPU, or indeed any process being carried out by the distributed computing system, may refer to the degree to which that process will be, or is likely to be requested, or carried out or in an upcoming time interval. Priority may also refer to the speed which data will be required to be either returned after a read request, or written/updated after a write/update request; in other words, high priority data may be characterized as data that requires minimal response latency after a data request therefor. This may or may not be due to the frequency of related or similar requests or the urgency and/or importance of the associated data. Data resources may each have an impact on such performance indicators: flash can provide higher throughput and lower latency than spinning disk, high speed buses and NICs can provide higher throughput and lower latency for the applicable PDU, and some processors can execute processing steps with higher throughput and lower latency than others. In some cases, the priority characteristics of a given set of data may favour, for example, throughput over latency; the system should prefer that such data be matched appropriately with data resources whose operating characteristics (always or at any given time) can provide the necessary performance when needed. While the preceding examples refer to throughput and latency, other performance characteristics or indicators may be considered.

In some cases, a high frequency of data transactions (i.e. read, write, or update) involving the data in a given time period will indicate a higher priority, and conversely a low frequency of data transactions involving such data will indicate a lower priority. Alternatively, priority of data may be used to describe any of the above states or combinations thereof. In some uses herein, as would be understood by a person skilled in the art, priority may be described as temperature or hotness. Priority of a process may also indicate one or more of the following: the likelihood that such a process will be called, requested, or carried out in an upcoming time interval, the forward "distance" in time or data stack PDU until the next time/PDU that such process will be need to be carried out (predicted or otherwise), the frequency that such process will be carried out, and the urgency and/or importance of such process, or the urgency or the importance of the results of such process. As is often used by a person skilled in the art, hot data is data of high priority and cold data is data of low priority. The use of the term "hot" may be used to describe data that is frequently used, likely to be frequently used, likely to be used soon, must be returned, written, or updated, as applicable, with high speed, or is required (or required to be processed) by some critical system operation; that is, the data has high priority. The term "cold" could be used to describe data that is that is infrequently used, unlikely to be frequently used, unlikely to be used soon, need not be returned, written, updated, as applicable, with high speed, or is required (or required to be processed) by some non-critical or non-urgent system operation; that is, the data has low priority. Priority may refer to the scheduled, likely, or predicted forward distance, as measured in either time or number of processes (i.e. packets or requests in a communications stack), between the current time and when the data will be called, updated, returned, written, processed, executed, communicated, or used. In some cases, the data associated with a process can have a priority that is independent of the priority of the process; for example, "hot" data that is called frequently at a given time, may be used by a "cold" process, that is, for example, a process associated with results that are of low urgency to the requesting client. In such cases, for example, the data can be maintained on a higher tier of data, while the processing will take place only when processing resources become available that need not process other activities of higher priority. Of course other examples and combinations of relative data and process priorities can be supported. The priority of data or a process can be determined by assessing past activities and patterns, prediction, or by explicitly assigning such priority by an administrator, user or client.

The nodes may coordinate amongst themselves to react to a change to the system, such as a change in prioritization, by, for example, moving stored data units to data storage units having higher or lower performing storage resources (i.e. higher or lower tiers of data), compute resources, or communication resources, in accordance with a rearrangement plan and into an alternate arrangement. In other cases, the system will utilize a data storage component that has a replicate thereon and which has the necessary operational characteristics (or at least improved operational characteristics relative to the data storage component that may have been associated with a replicate that was previously used). In such embodiments, there may be a switching component acting as an interface, which will direct data requests to the appropriate locations in plurality of data storage components in accordance with the alternate arrangement. In some embodiments, the switching component can participate in the efficient distribution and placement of data across the data storage components so that the number of reassignment steps is minimized, particularly to the extent that incoming data requests can be used to divert data or replicates in accordance with a selected alternate arrangement. The switching component may provide instructions to move data and/or re-map data in the data object store in accordance with a selected alternate arrangement. In other embodiments, the switch and the data storage components cooperate to rearrange the data units into the selected alternate arrangement.

In embodiments, any one or more of the following non-limiting exemplary changes to the system may trigger the determination of alternate arrangements: a change in the number, rate, or nature of data storage operations; a change in the number, rate, or nature of application-specific processing requirements (whether or not in a VPU); a change in the amount, type, priority or other characteristic of client data; the number or type of clients using the system; additional or fewer constraints, or changes to existing constraints; and changes in the operation of the distributed computing system, including but not limited to adding or removing nodes or resources thereof or changes in the operation of nodes or resources thereof.

In some embodiments, data resources may be arranged on the presumption that moving computation is cheaper than moving data. This may mean ensuring that replicates of a given data unit are stored "near" the computational analysis being performed by a given application, for example by a VPU. In general, a computation requested by an application is much more efficient if it is executed near the data it operates on. This is especially true when the size of the data set is huge. This minimizes network congestion and increases the overall throughput of the system. As such, there is some inter-relationship between storage resources, compute resources, and communications resources as a constraint relating to any one of the resources may be met (or indeed detrimentally impacted) by a corresponding reassignment relating to another resource.

In some embodiments there is provided a method for resource monitoring and management, as well as a corresponding system for resource monitoring and management in accordance with the subject matter of the systems for dynamic resource allocation disclosed herein. In some such embodiments, there is provided a method of resource monitoring in which workload profiles and/or analyses are compiled, in some embodiments as they may specifically relate to some or all of the resources associated with a distributed data storage system (or indeed other kind of distributed data processing system). The resulting workload profiles can be generated in order to characterize a given resource, or tier or class of resource, in respect of the processing of that workload by that resource, or class or tier thereof. Such characterizations can then be used to monitor the performance and performance limitations of such resources in respect of a workload. In some embodiments, such monitoring can then be used to prioritize the use of other or additional resources for specific workloads at specific times; alternatively, or in addition, the system may provide a proactive recommendation to a system user or administrator if a particular resource, which is prioritized for a given workload, becomes overloaded and/or saturated (e.g. a given resource receives processing requests at a faster rate than it can process them) wherein the recommendation may include a recommendation to obtain additional such resources, to run certain workloads at specific times (including relative to other workloads). Workload profile information may be utilized by the constraint engine in order to make resource/workload placement in association with an understanding of the performance cost associated with either moving certain workload processing steps to alternative resources, or prioritizing and/or scheduling workloads relative to one another. As such, resource planning and monitoring recommendations can be made proactively to, for example, initiate an automatic recommendation for additional storage resources of a specific tier of storage or additional processing or communications resources. Moreover, proactive analyses of costs vs. performance improvement can be undertaken by the resource engine to assess what would happen by, for example, shifting workloads in time (possibly relative to other workloads), increasing or decreasing the priority of certain workloads, or by utilizing certain resources or resource types for particular workloads (or workload types). An example of incorporating our detailed knowledge of workload behavior into placement analyses can include utilizing a workload analysis tool, such as Coho Data™'s counter stack information to collect information suitable to (a) identify the precise flash (or other higher tier of storage) needs of a given workload and estimate the cost and value of assigning it to more or less high-performance memory, and (b) look for temporal patterns in workload activity (e.g., this workload is active every morning at 9, this one is busy once a week on Saturday, etc.), to try to reduce contention between co-located workloads.

As an exemplary embodiment, set forth herein for illustrative purposes, the constraint engine may comprise a special-purpose computing device comprising a processing resource and, stored on a computer-readable medium accessible by the processing resource, a software package written in python. The software package, when executed, causes the constraint engine to access or generate a file system model and a database of constraints; the constraint engine further comprises, upon execution of aspects of the software package, one or more solvers. The file system model represents the state of the storage system, including file (or other data object) placement and size, disk location, capacity, and usage, etc., and it supports converting this state into information that is compatible with the solver(s). The file system model may also be used for updating the current state in response both to workload changes in the system and allocation decisions made by the solvers, and for maintaining a customizable priority order over the set of stores in the system (e.g., prioritize moving objects to empty stores), to break ties during the placement process when all other constraint costs are equal.

In some such embodiments, the constraint database is a set of rules governing the placement of data in the system. Rules are defined for particular types in the system. For example, rules can affect individual replicas, or replica sets, or whole files, or even directories or file systems. Rule implementations may do, inter alia, two things: (1) they compute the cost of the current or proposed placement for a given entity (e.g., whether a current stripe is or will be violating the rule or not), and (2) they predict the cost of moving the entity to other resources (for example, if a rule knows that moving a stripe to a first data storage resource would violate its predicate, the rule can provide a hint to this effect to de-prioritize said first data storage resource in the search for new placements. Rules defined over composite data objects (replica sets, striped files, etc.) enforce mutual constraints, and are invoked whenever the placement of any entity in the object changes. For example, if a rule governs the placement of a replica set, the rule will be invoked whenever a placement decision is made for any replica in the set, since moving just one replica could be sufficient to satisfy (or violate) the rule.

The solvers may implement different heuristics or methodologies for searching for new arrangements. Such different heuristics can make trade-offs in terms of computational complexity and solution quality. For example, a classic backtracking heuristic may consider every possible arrangement of data in the system (giving an exponential search space but guaranteeing the minimal-cost solution), while a "greedy" solver only considers moving each object in the system at most once (giving a linear search space but possibly producing a sub-optimal solution). The solvers can additionally be tuned to minimize reallocations (i.e. data migration) to avoid the cost of placement reconfigurations.

Upon identification of a new placement of data by the constraint engine, data migration is accomplished by (a) updating the metadata describing the placement of the objects, (b) communicating to the storage servers via rpc that migrations are required, (c) copying the objects to their new locations (if necessary) while continuing to serve IO from their existing locations, and (d) removing objects from their original locations (if necessary) only after the new copies are fully up to date. Both the metadata database and the routines for migrating data are written in C in this non-limiting exemplary embodiment, and they are tightly integrated with the core storage stack.

In some embodiments, a placement service, which may be instantiated upon execution of a set of computer-readable instructions—and also written in python in this exemplary embodiment, is run on every node in the system, and arranges for exactly or at least one node to be active at any give time. This service actively monitors the state of the cluster of nodes, periodically collecting information on usage and workload behavior (including specific resource use for the applicable node or nodes, and then communication such information into the constraint engine. The constraint engine is configured to receive such information and respond automatically to changes in usage, cluster topology (e.g., the addition or removal of data storage or other resources) and placement policy (e.g., replication factor, etc.) by updating the file system model and searching for new layouts that reduce or eliminate the cost of constraint violations.

As another example, enterprise data storage customers often deploy the Coho Data™ product with only one 2u chassis of two nodes to start with. As their capacity/performance requirements increase, they may choose to add another 2u chassis some time in the future. When this occurs, the durability of data stored on the original chassis is now sub-optimal, because it is not taking full advantage of the available hardware redundancy. The placement service is configured to identify the addition of the new hardware, identify the files which have all their replicas on the original chassis, and then to reconfigure these files so that they are replicated across both chassis. In the meantime, if the placement service notices that one of the stores on the new chassis is being over-utilized (perhaps due to a hotspot in the client workload), it can arrange to move some of the data off of that store onto a different store to help balance the load while maintaining the improved durability of cross-chassis replication. In some embodiments, the placement service notice may be configured, if and/or when different workloads on the same store/node are active at the same time of day, to arrange or to move some or all data related to such workload onto stores/nodes where there is less contention for the same resources during that time. Traditional techniques, like RAID and consistent hashing, use more deterministic placement algorithms that are less suited for dynamically adapting to changes in operational characteristics.

While the present disclosure describes various exemplary embodiments, the disclosure is not so limited. To the contrary, the disclosure is intended to cover various modifications and equivalent arrangements included within the general scope of the present disclosure.

What is claimed:

1. A data storage system, comprising:
   a plurality of data storage components communicatively coupled to each other, each of the data storage components comprising at least one data resource selected from a data storage media for storing client-related digital information and a data processor for processing the client-related digital information;
   a constraint engine comprising a constraint processor and a constraint database, the constraint database receiving and storing changeable digital constraint parameters indicative of permissible operational constraints on the data storage system, and the constraint processor determining permissible data resource assignment arrangements in accordance with the changeable digital constraint parameters so to assign at least some of the data resources for use with the client-related digital information in compliance with the permissible operational constraints on the data storage system; and
   wherein, in response to an operational change to the data storage system, at least some the data resource are reassigned from a current permissible data resource assignment arrangement to an alternate permissible data resource assignment arrangement and wherein a reassignment is selected when compliant with a set of the changeable digital constraint parameters.

2. The system of claim 1, wherein the constraint engine selects the alternate permissible data resource arrangement from two or more alternate permissible data resource arrangements determined to comply with respective designated sets of the changeable digital constraint parameters.

3. The system of claim 2, wherein the constraint engine determines additional alternate arrangements by one or more of:
   selecting a reassignment of at least one data resource in a given alternate arrangement;
   determining compliance with the respective designated sets of the changeable digital constraint parameters for the given alternate assignment with the selected data resource reassignment; and
   reassigning the at least one data source until a degree of compliance decreases by at least a compliance threshold value.

4. The system of claim 3, wherein the selecting, determining and reassigning are repeated for at least one other data resource in an alternate assignment.

5. The system of claim 1, comprising two or more alternate permissible data resource arrangements, wherein the constraint engine further determines a number of reassignment steps required to change from the current arrangement to each of the two or more alternate arrangements, and wherein the alternate arrangement is selected as a function of the numbers for the two or more alternate arrangements.

6. The system of claim 5, wherein the constraint engine reassigns each the data resource in accordance with an additional alternate arrangement that requires a fewest number of the reassignment steps to change from the current arrangement.

7. The system of claim 1, further comprising one or more additional designated digital constraint parameters and selecting an alternate assignment arrangement upon determining that the alternate assignment comply with the additional designated digital constraints.

8. The system of claim 7, wherein the designated reassignment threshold is calculated based on a degree of compliance with the with the designated set of changeable digital constraint parameters.

9. The system of claim 1, wherein the operational change comprises one or more of a change in a compliance of one or more of the changeable digital constraint parameters, a change to the changeable digital constraint parameters, a change to the client-related digital information, and a change to an operational parameter to the data storage system.

10. The system of claim 1, wherein the operational change comprises a change to an operational parameter to the data storage system, and wherein the operational parameter comprises one or more of an increase or a decrease in an operational data resource capacity, an increase or a decrease in a number of available data resources, and an increase or a decrease in a number of available data storage components.

11. The system of claim 1, wherein the operational change comprises a change to the client-related digital information comprising any one or more of the following a change in an amount of client-related digital information stored on or communicated to the system, a change to a priority of at least some of the client-related digital information, and a change to user-requirements of the client-related digital information.

12. The system of claim 1, wherein the data storage system further comprises a switching component as an interface between one or more data clients and the distributed data storage system.

13. The system of claim 12, wherein the switching component exposes the data storage system to clients by one of the following: a communications address and a range of communications addresses.

14. The system of claim 13, wherein the switching component forwards data traffic relating to the client-related digital information across a plurality of data resources to balance a use of the data resources.

15. A method for constraint-based arrangement of data resources in a distributed data storage system, the data storage system comprising a constraint engine and a plurality of communicatively coupled data storage components, each data storage component comprising at least one of the following data resources: data storage media for storing client-related digital information and a data processor for processing the client-related digital information, the method comprising:
   receiving at the constraint engine at least one first changeable digital constraint parameter corresponding to at least some of the data resources indicative of permissible operational constraints on the data resources;
   determining at the constraint engine alternate arrangements of assignments of the data resources for use in association with the said client-related digital information, wherein the alternate arrangements comply with at least a first set of the changeable digital constraint parameters; and
   reassigning the client-related tasks the data resources in accordance with a selected one of the alternate arrangements upon an operational change to the data storage system, and
   wherein a reassignment of the client-related tasks is selected when compliant with a set of the changeable digital constraint parameters.

16. The method of claim 15, wherein the operational change to data storage system comprises one or more of the following: a change in the compliance of one or more of the changeable digital constraint parameters, a change to the changeable digital constraint parameters, a change to the client-related digital information, and a change to an operational parameter to the data storage system.

17. The method of claim 15, wherein the method further comprises the step of determining, for each alternate arrangement, the number of reassignment steps required to reassign data resources from a current arrangement to at least one of the alternate arrangements, and wherein the selected alternate arrangement is associated with a lower number of reassignment steps than a maximum threshold.

18. The method of claim 15, wherein the method further comprises the step of determining the alternate arrangements that comply with at least some of one or more second changeable digital constraint parameters, and wherein the selected alternate arrangement has a number of the one or more second changeable digital constraint parameters in compliance that is higher than for at least some non-selected alternate arrangements.

19. The method of claim 18, wherein the selected arrangement has a number steps for reassignment from a current assignment that is less than for at least some non-selected alternate arrangements.

20. A non-transitory computer readable medium comprising instruction that, when read by a processor, cause the processor to:
- receive at a constraint engine at least one first changeable digital constraint parameter corresponding to at least some data resources indicative of permissible operational constraints on the data resources;
- determining at the constraint engine alternate arrangements of assignments of the data resources for use in association with client-related digital information, wherein the alternate arrangements comply with at least a first set of the changeable digital constraint parameters; and
- reassigning the client-related tasks the data resources in accordance with a selected one of the alternate arrangements upon an operational change to a data storage system, and
- wherein a reassignment of the client-related tasks is selected when compliant with a set of the changeable digital constraint parameters.

* * * * *